US012569849B2

(12) United States Patent
Craighead et al.

(10) Patent No.: US 12,569,849 B2
(45) **Date of Patent: *Mar. 10, 2026**

(54) MULTIFUNCTIONAL MICROFLUIDIC DEVICE FOR CAPTURING TARGET CELLS AND ANALYZING GENOMIC DNA ISOLATED FROM THE TARGET CELLS WHILE UNDER FLOW CONDITIONS

(71) Applicant: CORNELL UNIVERSITY, Ithaca, NY (US)

(72) Inventors: Harold G. Craighead, Ithaca, NY (US); Sarah J. Reinholt, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,553

(22) Filed: Feb. 23, 2023

(65) Prior Publication Data

US 2023/0285967 A1 Sep. 14, 2023

Related U.S. Application Data

(63) Continuation of application No. 16/303,658, filed as application No. PCT/US2017/033789 on May 22, 2017, now Pat. No. 11,602,747.

(Continued)

(51) Int. Cl.
*B01L 3/00* (2006.01)
*B01L 1/00* (2006.01)

(52) U.S. Cl.
CPC ... *B01L 3/502753* (2013.01); *B01L 3/502761* (2013.01); *B01L 2200/0663* (2013.01);
(Continued)

(58) Field of Classification Search
CPC ......... B01L 3/502753; B01L 2400/086; B01L 3/502761
See application file for complete search history.

(56) References Cited

U.S. PATENT DOCUMENTS

| | | | |
|---|---|---|---|
| 6,977,148 | B2 | 12/2005 | Dean et al. |
| 7,384,561 | B2 | 6/2008 | Utsunomiya |

(Continued)

FOREIGN PATENT DOCUMENTS

| | | | |
|---|---|---|---|
| WO | 2015077441 | A2 | 5/2015 |
| WO | 2017004463 | A1 | 1/2017 |

OTHER PUBLICATIONS

International Search Report, PCT/US2017/033789, mailed Aug. 29, 2017.
Written Opinion, PCT/US2017/033789, mailed Aug. 29, 2017.
Zhang et al., "Aptamers selected by cell-SELEX for application in cancer studies," Bioanalysis, 2(5):907-918 (2010).
Dickey et al., "Oligonucleotide aptamers: A next-generation technology for the capture and detection of circulating tumor cells," Methods, 97:94-103 (2016).

(Continued)

*Primary Examiner* — Nathan A Bowers
(74) *Attorney, Agent, or Firm* — FisherBroyles, LLP; Andrew K. Gonsalves

(57) ABSTRACT

The present invention relates to, inter alia, a microfluidic device for capturing target cells and analyzing genomic DNA isolated from the target cells while under flow conditions. The microfluidic device includes a cell microchannel and a nucleic acid microchannel that intersect in an orthogonal manner, thereby forming a cell capture intersection region. The microfluidic device also includes a cell capture array and a nucleic acid entanglement array. The cell capture array includes a plurality of cell capturing micropillars and is located in the cell capture intersection region. The nucleic acid entanglement array includes a plurality of nucleic acid entanglement micropillars that function to physically entangle and maintain thereon genomic DNA isolated from the one or more target cell, and is located in a portion of the nucleic acid microchannel that is adjacent to and down- (Continued)

Schematic of microfluidic channels for capture of different Biological components from a sample stream of the cell capture intersection region. Methods of using the microfluidic device are also disclosed.

18 Claims, 9 Drawing Sheets

Specification includes a Sequence Listing.

Related U.S. Application Data

(60) Provisional application No. 62/339,924, filed on May 22, 2016.

(52) U.S. Cl.
CPC .................. *B01L 2200/0668* (2013.01); *B01L 2300/0816* (2013.01); *B01L 2300/0864* (2013.01); *B01L 2400/0487* (2013.01); *B01L 2400/086* (2013.01)

(56) References Cited

U.S. PATENT DOCUMENTS

| | | | |
|---|---|---|---|
| 8,562,918 B2 | 10/2013 | Jovanovich et al. | |
| 8,871,446 B2 | 10/2014 | Hong et al. | |
| 9,086,406 B2 | 7/2015 | Lee et al. | |
| 9,128,091 B2 | 9/2015 | Toner et al. | |
| 9,250,242 B2 | 2/2016 | Martin et al. | |
| 9,506,845 B2 | 11/2016 | Fowler et al. | |
| 2008/0124779 A1 | 5/2008 | Oh et al. | |
| 2011/0071038 A1* | 3/2011 | Ermantraut ....... | B01L 3/502707 506/9 |
| 2011/0301058 A1 | 12/2011 | Cheng et al. | |
| 2012/0091235 A1 | 4/2012 | Li et al. | |
| 2014/0154703 A1* | 6/2014 | Skelley ............ | B01L 3/502761 435/7.23 |
| 2014/0194313 A1* | 7/2014 | Craighead ............ | C12Q 1/6806 422/534 |
| 2015/0099642 A1 | 4/2015 | Barany et al. | |

OTHER PUBLICATIONS

Wan et al., "Capture, isolation and release of cancer cells with aptamer-functionalized glass bead array," Lab Chip, 12:4693-4701 (2012).

Phillips et al., "Enrichment of Cancer Cells Using Aptamers Immobilized on a Microfluidic Channel," Anal. Chem., 81:1033-1039 (2009).

Zheng et al., "Aptamer-Functionalized Barcode Particles for the Capture and Detection of Multiple Types of Circulating Tumor Cells," Adv. Mater., 26:7333-7338 (2014).

Xu et al., "Aptamer-Based Microfluidic Device for Enrichment, Sorting, and Detection of Multiple Cancer Cells," Anal. Chem., 81:7436-7442 (2009).

Sheng et al., "Aptamer-Enabled Efficient Isolation of Cancer Cells from Whole Blood Using a Microfluidic Device," Anal. Chem., 84:4199-4206 (2012).

Shen et al., "Specific Capture and Release of Circulating Tumor Cells Using Aptamer-Modified Nanosubstrates," Adv. Mater., 25:2368-2373 (2013).

Chen et al., "Targeted isolation and analysis of single tumor cells with aptamer-encoded microwell array on microfluidic device," Lab Chip, 12:5180-5185 (2012).

Liu et al., "Rare cell chemiluminescence detection based on aptamer-specific capture in microfluidic channels," Biosensors and Bioelectronics, 28:438-442 (2011).

Lin et al., "Assay of multiplex proteins from cell metabolism based on tunable aptamer and microchip electrophoresis," Biosensors and Bioelectronics, 63:105-111 (2015).

Martin et al., "Capturing cancer cells using aptamer-immobilized square capillary channels," Mol. BioSyst., 7:1720-1727 (2011).

Cabodi et al., "Entropic Recoil Separation of Long DNA Molecules," Anal. Chem., 74:5169-5174 (2002).

Benitez et al., "Microfluidic extraction, stretching and analysis of human chromosomal DNA from single cells," Lab Chip, 12:4848-4854 (2012).

* cited by examiner

Schematic of microfluidic channels for capture of different Biological components from a sample

SEQUENCE LISTING

```
Sequence total quantity: 129
SEQ ID NO: 1             moltype = DNA  length = 72
FEATURE                  Location/Qualifiers
source                   1..72
                         mol_type = genomic DNA
                         organism = Homo sapiens
SEQUENCE: 1
agatgttttg ccaactggcc aagacctgcc ctgtgcagct gtgggttgat tccacacccc  60
cgcccggcac cc                                                      72

SEQ ID NO: 2             moltype = DNA  length = 72
FEATURE                  Location/Qualifiers
source                   1..72
                         mol_type = genomic DNA
                         organism = Homo sapiens
SEQUENCE: 2
agatgttttg ccaactggcc aagaactgcc ctgtgcagct gtgggttgat tccacacccc  60
cgcccggcac cc                                                      72

SEQ ID NO: 3             moltype = DNA  length = 71
FEATURE                  Location/Qualifiers
misc_feature             1..71
                         note = n is a, c, g, or t
source                   1..71
                         mol_type = genomic DNA
                         organism = Homo sapiens
SEQUENCE: 3
agatgtttng ctactggcca agacctgccc tgtgcagctg tgggttgatt ccacaccccc  60
gcccggcacc c                                                       71

SEQ ID NO: 4             moltype = DNA  length = 10
FEATURE                  Location/Qualifiers
misc_feature             1..10
                         note = Primer
source                   1..10
                         mol_type = other DNA
                         organism = synthetic construct
SEQUENCE: 4
ttgtgccctg                                                         10

SEQ ID NO: 5             moltype = DNA  length = 10
FEATURE                  Location/Qualifiers
misc_feature             1..10
                         note = Primer
source                   1..10
                         mol_type = other DNA
                         organism = synthetic construct
SEQUENCE: 5
gccatggcgc                                                         10

SEQ ID NO: 6             moltype = DNA  length = 10
FEATURE                  Location/Qualifiers
misc_feature             1..10
                         note = Primer
source                   1..10
                         mol_type = other DNA
                         organism = synthetic construct
SEQUENCE: 6
cagttgcttt                                                         10

SEQ ID NO: 7             moltype = DNA  length = 10
FEATURE                  Location/Qualifiers
misc_feature             1..10
                         note = Primer
source                   1..10
                         mol_type = other DNA
                         organism = synthetic construct
SEQUENCE: 7
gctgtgactg                                                         10

SEQ ID NO: 8             moltype = DNA  length = 10
FEATURE                  Location/Qualifiers
misc_feature             1..10
                         note = Primer
source                   1..10
                         mol_type = other DNA
                         organism = synthetic construct
SEQUENCE: 8
```

```
gtttctttgc                                                          10

SEQ ID NO: 9           moltype = DNA  length = 10
FEATURE                Location/Qualifiers
misc_feature           1..10
                       note = Primer
source                 1..10
                       mol_type = other DNA
                       organism = synthetic construct
SEQUENCE: 9
cctcacaacc                                                          10

SEQ ID NO: 10          moltype = DNA  length = 10
FEATURE                Location/Qualifiers
misc_feature           1..10
                       note = Primer
source                 1..10
                       mol_type = other DNA
                       organism = synthetic construct
SEQUENCE: 10
ggaggtgctt                                                          10

SEQ ID NO: 11          moltype = DNA  length = 10
FEATURE                Location/Qualifiers
misc_feature           1..10
                       note = Primer
source                 1..10
                       mol_type = other DNA
                       organism = synthetic construct
SEQUENCE: 11
cgctcatggt                                                          10

SEQ ID NO: 12          moltype = DNA  length = 10
FEATURE                Location/Qualifiers
misc_feature           1..10
                       note = Primer
source                 1..10
                       mol_type = other DNA
                       organism = synthetic construct
SEQUENCE: 12
tagctcgcta                                                          10

SEQ ID NO: 13          moltype = DNA  length = 10
FEATURE                Location/Qualifiers
misc_feature           1..10
                       note = Primer
source                 1..10
                       mol_type = other DNA
                       organism = synthetic construct
SEQUENCE: 13
caccatcgct                                                          10

SEQ ID NO: 14          moltype = DNA  length = 10
FEATURE                Location/Qualifiers
misc_feature           1..10
                       note = Primer
source                 1..10
                       mol_type = other DNA
                       organism = synthetic construct
SEQUENCE: 14
gtgtagacgc                                                          10

SEQ ID NO: 15          moltype = DNA  length = 10
FEATURE                Location/Qualifiers
misc_feature           1..10
                       note = Primer
source                 1..10
                       mol_type = other DNA
                       organism = synthetic construct
SEQUENCE: 15
tctctccagc                                                          10

SEQ ID NO: 16          moltype = DNA  length = 10
FEATURE                Location/Qualifiers
misc_feature           1..10
                       note = Primer
source                 1..10
                       mol_type = other DNA
                       organism = synthetic construct
```

```
SEQUENCE: 16
cctatctcaa                                                        10

SEQ ID NO: 17           moltype = DNA  length = 10
FEATURE                 Location/Qualifiers
misc_feature            1..10
                        note = Primer
source                  1..10
                        mol_type = other DNA
                        organism = synthetic construct
SEQUENCE: 17
ctgggcaacc                                                        10

SEQ ID NO: 18           moltype = DNA  length = 10
FEATURE                 Location/Qualifiers
misc_feature            1..10
                        note = Primer
source                  1..10
                        mol_type = other DNA
                        organism = synthetic construct
SEQUENCE: 18
cctgagtgac                                                        10

SEQ ID NO: 19           moltype = DNA  length = 10
FEATURE                 Location/Qualifiers
misc_feature            1..10
                        note = Primer
source                  1..10
                        mol_type = other DNA
                        organism = synthetic construct
SEQUENCE: 19
gaatcagagg                                                        10

SEQ ID NO: 20           moltype = DNA  length = 10
FEATURE                 Location/Qualifiers
misc_feature            1..10
                        note = Primer
source                  1..10
                        mol_type = other DNA
                        organism = synthetic construct
SEQUENCE: 20
atcacaccac                                                        10

SEQ ID NO: 21           moltype = DNA  length = 10
FEATURE                 Location/Qualifiers
misc_feature            1..10
                        note = Primer
source                  1..10
                        mol_type = other DNA
                        organism = synthetic construct
SEQUENCE: 21
acctaagagc                                                        10

SEQ ID NO: 22           moltype = DNA  length = 10
FEATURE                 Location/Qualifiers
misc_feature            1..10
                        note = Primer
source                  1..10
                        mol_type = other DNA
                        organism = synthetic construct
SEQUENCE: 22
ggaggctgca                                                        10

SEQ ID NO: 23           moltype = DNA  length = 10
FEATURE                 Location/Qualifiers
misc_feature            1..10
                        note = Primer
source                  1..10
                        mol_type = other DNA
                        organism = synthetic construct
SEQUENCE: 23
agatgctgag                                                        10

SEQ ID NO: 24           moltype = DNA  length = 10
FEATURE                 Location/Qualifiers
misc_feature            1..10
                        note = Primer
source                  1..10
                        mol_type = other DNA
```

```
                        organism = synthetic construct
SEQUENCE: 24
atcacttgag                                                         10

SEQ ID NO: 25           moltype = DNA  length = 10
FEATURE                 Location/Qualifiers
misc_feature            1..10
                        note = Primer
source                  1..10
                        mol_type = other DNA
                        organism = synthetic construct
SEQUENCE: 25
tccacacgca                                                         10

SEQ ID NO: 26           moltype = DNA  length = 10
FEATURE                 Location/Qualifiers
misc_feature            1..10
                        note = Primer
source                  1..10
                        mol_type = other DNA
                        organism = synthetic construct
SEQUENCE: 26
taggaggctg                                                         10

SEQ ID NO: 27           moltype = DNA  length = 10
FEATURE                 Location/Qualifiers
misc_feature            1..10
                        note = Primer
source                  1..10
                        mol_type = other DNA
                        organism = synthetic construct
SEQUENCE: 27
tgtttctgtc                                                         10

SEQ ID NO: 28           moltype = DNA  length = 10
FEATURE                 Location/Qualifiers
misc_feature            1..10
                        note = Primer
source                  1..10
                        mol_type = other DNA
                        organism = synthetic construct
SEQUENCE: 28
cacctatagt                                                         10

SEQ ID NO: 29           moltype = DNA  length = 10
FEATURE                 Location/Qualifiers
misc_feature            1..10
                        note = Primer
source                  1..10
                        mol_type = other DNA
                        organism = synthetic construct
SEQUENCE: 29
caccacacta                                                         10

SEQ ID NO: 30           moltype = DNA  length = 10
FEATURE                 Location/Qualifiers
misc_feature            1..10
                        note = Primer
source                  1..10
                        mol_type = other DNA
                        organism = synthetic construct
SEQUENCE: 30
tagccaggca                                                         10

SEQ ID NO: 31           moltype = DNA  length = 10
FEATURE                 Location/Qualifiers
misc_feature            1..10
                        note = Primer
source                  1..10
                        mol_type = other DNA
                        organism = synthetic construct
SEQUENCE: 31
tcaggcggct                                                         10

SEQ ID NO: 32           moltype = DNA  length = 10
FEATURE                 Location/Qualifiers
misc_feature            1..10
                        note = Primer
source                  1..10
```

```
                        mol_type = other DNA
                        organism = synthetic construct
SEQUENCE: 32
acctcgtctc                                             10

SEQ ID NO: 33           moltype = DNA  length = 10
FEATURE                 Location/Qualifiers
misc_feature            1..10
                        note = Primer
source                  1..10
                        mol_type = other DNA
                        organism = synthetic construct
SEQUENCE: 33
ccccagttgc                                             10

SEQ ID NO: 34           moltype = DNA  length = 10
FEATURE                 Location/Qualifiers
misc_feature            1..10
                        note = Primer
source                  1..10
                        mol_type = other DNA
                        organism = synthetic construct
SEQUENCE: 34
agcctgggta                                             10

SEQ ID NO: 35           moltype = DNA  length = 10
FEATURE                 Location/Qualifiers
misc_feature            1..10
                        note = Primer
source                  1..10
                        mol_type = other DNA
                        organism = synthetic construct
SEQUENCE: 35
ttaaccccctc                                            10

SEQ ID NO: 36           moltype = DNA  length = 10
FEATURE                 Location/Qualifiers
misc_feature            1..10
                        note = Primer
source                  1..10
                        mol_type = other DNA
                        organism = synthetic construct
SEQUENCE: 36
gagcccagga                                             10

SEQ ID NO: 37           moltype = DNA  length = 10
FEATURE                 Location/Qualifiers
misc_feature            1..10
                        note = Primer
source                  1..10
                        mol_type = other DNA
                        organism = synthetic construct
SEQUENCE: 37
agggccactg                                             10

SEQ ID NO: 38           moltype = DNA  length = 10
FEATURE                 Location/Qualifiers
misc_feature            1..10
                        note = Primer
source                  1..10
                        mol_type = other DNA
                        organism = synthetic construct
SEQUENCE: 38
ccaaggcagg                                             10

SEQ ID NO: 39           moltype = DNA  length = 10
FEATURE                 Location/Qualifiers
misc_feature            1..10
                        note = Primer
source                  1..10
                        mol_type = other DNA
                        organism = synthetic construct
SEQUENCE: 39
cccccctact                                             10

SEQ ID NO: 40           moltype = DNA  length = 10
FEATURE                 Location/Qualifiers
misc_feature            1..10
                        note = Primer
```

```
source                  1..10
                        mol_type = other DNA
                        organism = synthetic construct
SEQUENCE: 40
tcccagcact                                                             10

SEQ ID NO: 41           moltype = DNA  length = 10
FEATURE                 Location/Qualifiers
misc_feature            1..10
                        note = Primer
source                  1..10
                        mol_type = other DNA
                        organism = synthetic construct
SEQUENCE: 41
tagggaggtc                                                             10

SEQ ID NO: 42           moltype = DNA  length = 10
FEATURE                 Location/Qualifiers
misc_feature            1..10
                        note = Primer
source                  1..10
                        mol_type = other DNA
                        organism = synthetic construct
SEQUENCE: 42
ttggtggctc                                                             10

SEQ ID NO: 43           moltype = DNA  length = 10
FEATURE                 Location/Qualifiers
misc_feature            1..10
                        note = Primer
source                  1..10
                        mol_type = other DNA
                        organism = synthetic construct
SEQUENCE: 43
ttgcacatct                                                             10

SEQ ID NO: 44           moltype = DNA  length = 10
FEATURE                 Location/Qualifiers
misc_feature            1..10
                        note = Primer
source                  1..10
                        mol_type = other DNA
                        organism = synthetic construct
SEQUENCE: 44
gtccagagcc                                                             10

SEQ ID NO: 45           moltype = DNA  length = 10
FEATURE                 Location/Qualifiers
misc_feature            1..10
                        note = Primer
source                  1..10
                        mol_type = other DNA
                        organism = synthetic construct
SEQUENCE: 45
gcagccgcag                                                             10

SEQ ID NO: 46           moltype = DNA  length = 10
FEATURE                 Location/Qualifiers
misc_feature            1..10
                        note = Primer
source                  1..10
                        mol_type = other DNA
                        organism = synthetic construct
SEQUENCE: 46
agccgccgca                                                             10

SEQ ID NO: 47           moltype = DNA  length = 10
FEATURE                 Location/Qualifiers
misc_feature            1..10
                        note = Primer
source                  1..10
                        mol_type = other DNA
                        organism = synthetic construct
SEQUENCE: 47
gaacgtggga                                                             10

SEQ ID NO: 48           moltype = DNA  length = 10
FEATURE                 Location/Qualifiers
misc_feature            1..10
```

```
                        note = Primer
source                  1..10
                        mol_type = other DNA
                        organism = synthetic construct
SEQUENCE: 48
agtcgctgca                                                          10

SEQ ID NO: 49           moltype = DNA  length = 10
FEATURE                 Location/Qualifiers
misc_feature            1..10
                        note = Primer
source                  1..10
                        mol_type = other DNA
                        organism = synthetic construct
SEQUENCE: 49
ttcgcatccg                                                          10

SEQ ID NO: 50           moltype = DNA  length = 10
FEATURE                 Location/Qualifiers
misc_feature            1..10
                        note = Primer
misc_feature            1..10
misc_feature            1..10
                        note = Primer
source                  1..10
                        mol_type = other DNA
                        organism = synthetic construct
SEQUENCE: 50
tgctgaggag                                                          10

SEQ ID NO: 51           moltype = DNA  length = 10
FEATURE                 Location/Qualifiers
misc_feature            1..10
                        note = Primer
source                  1..10
                        mol_type = other DNA
                        organism = synthetic construct
SEQUENCE: 51
ctgaccaggg                                                          10

SEQ ID NO: 52           moltype = DNA  length = 10
FEATURE                 Location/Qualifiers
misc_feature            1..10
                        note = Primer
source                  1..10
                        mol_type = other DNA
                        organism = synthetic construct
SEQUENCE: 52
gccgctgcca                                                          10

SEQ ID NO: 53           moltype = DNA  length = 10
FEATURE                 Location/Qualifiers
misc_feature            1..10
                        note = Primer
source                  1..10
                        mol_type = other DNA
                        organism = synthetic construct
SEQUENCE: 53
cacaccctag                                                          10

SEQ ID NO: 54           moltype = DNA  length = 10
FEATURE                 Location/Qualifiers
misc_feature            1..10
                        note = Primer
source                  1..10
                        mol_type = other DNA
                        organism = synthetic construct
SEQUENCE: 54
cttctcccca                                                          10

SEQ ID NO: 55           moltype = DNA  length = 10
FEATURE                 Location/Qualifiers
misc_feature            1..10
                        note = Primer
source                  1..10
                        mol_type = other DNA
                        organism = synthetic construct
SEQUENCE: 55
gcaaccaggc                                                          10
```

```
SEQ ID NO: 56           moltype = DNA  length = 10
FEATURE                 Location/Qualifiers
misc_feature            1..10
                        note = Primer
source                  1..10
                        mol_type = other DNA
                        organism = synthetic construct
SEQUENCE: 56
ccgttcggag                                                        10

SEQ ID NO: 57           moltype = DNA  length = 10
FEATURE                 Location/Qualifiers
misc_feature            1..10
                        note = Primer
source                  1..10
                        mol_type = other DNA
                        organism = synthetic construct
SEQUENCE: 57
caatcggtgg                                                        10

SEQ ID NO: 58           moltype = DNA  length = 10
FEATURE                 Location/Qualifiers
misc_feature            1..10
                        note = Primer
source                  1..10
                        mol_type = other DNA
                        organism = synthetic construct
SEQUENCE: 58
gaggccgccg                                                        10

SEQ ID NO: 59           moltype = DNA  length = 10
FEATURE                 Location/Qualifiers
misc_feature            1..10
                        note = Primer
source                  1..10
                        mol_type = other DNA
                        organism = synthetic construct
SEQUENCE: 59
ggaagagacc                                                        10

SEQ ID NO: 60           moltype = DNA  length = 10
FEATURE                 Location/Qualifiers
misc_feature            1..10
                        note = Primer
source                  1..10
                        mol_type = other DNA
                        organism = synthetic construct
SEQUENCE: 60
cccccgtggc                                                        10

SEQ ID NO: 61           moltype = DNA  length = 10
FEATURE                 Location/Qualifiers
misc_feature            1..10
                        note = Primer
source                  1..10
                        mol_type = other DNA
                        organism = synthetic construct
SEQUENCE: 61
ccgagctcgc                                                        10

SEQ ID NO: 62           moltype = DNA  length = 10
FEATURE                 Location/Qualifiers
misc_feature            1..10
                        note = Primer
source                  1..10
                        mol_type = other DNA
                        organism = synthetic construct
SEQUENCE: 62
cccgtccgcc                                                        10

SEQ ID NO: 63           moltype = DNA  length = 10
FEATURE                 Location/Qualifiers
misc_feature            1..10
                        note = Primer
source                  1..10
                        mol_type = other DNA
                        organism = synthetic construct
SEQUENCE: 63
```

```
gctcaacctc                                                          10

SEQ ID NO: 64           moltype = DNA  length = 10
FEATURE                 Location/Qualifiers
misc_feature            1..10
                        note = Primer
source                  1..10
                        mol_type = other DNA
                        organism = synthetic construct
SEQUENCE: 64
cccgggccgg                                                          10

SEQ ID NO: 65           moltype = DNA  length = 10
FEATURE                 Location/Qualifiers
misc_feature            1..10
                        note = Primer
source                  1..10
                        mol_type = other DNA
                        organism = synthetic construct
SEQUENCE: 65
gggcctaagc                                                          10

SEQ ID NO: 66           moltype = DNA  length = 10
FEATURE                 Location/Qualifiers
misc_feature            1..10
                        note = Primer
source                  1..10
                        mol_type = other DNA
                        organism = synthetic construct
SEQUENCE: 66
ggcggcggca                                                          10

SEQ ID NO: 67           moltype = DNA  length = 10
FEATURE                 Location/Qualifiers
misc_feature            1..10
                        note = Primer
source                  1..10
                        mol_type = other DNA
                        organism = synthetic construct
SEQUENCE: 67
cgtgcaacac                                                          10

SEQ ID NO: 68           moltype = DNA  length = 10
FEATURE                 Location/Qualifiers
misc_feature            1..10
                        note = Primer
source                  1..10
                        mol_type = other DNA
                        organism = synthetic construct
SEQUENCE: 68
gcctccaaca                                                          10

SEQ ID NO: 69           moltype = DNA  length = 10
FEATURE                 Location/Qualifiers
misc_feature            1..10
                        note = Primer
source                  1..10
                        mol_type = other DNA
                        organism = synthetic construct
SEQUENCE: 69
gcaactcagg                                                          10

SEQ ID NO: 70           moltype = DNA  length = 10
FEATURE                 Location/Qualifiers
misc_feature            1..10
                        note = Primer
source                  1..10
                        mol_type = other DNA
                        organism = synthetic construct
SEQUENCE: 70
cgccggagag                                                          10

SEQ ID NO: 71           moltype = DNA  length = 10
FEATURE                 Location/Qualifiers
misc_feature            1..10
                        note = Primer
source                  1..10
                        mol_type = other DNA
                        organism = synthetic construct
```

```
SEQUENCE: 71
gccctcaatg                                                      10

SEQ ID NO: 72          moltype = DNA  length = 10
FEATURE                Location/Qualifiers
misc_feature           1..10
                       note = Primer
source                 1..10
                       mol_type = other DNA
                       organism = synthetic construct
SEQUENCE: 72
gtcgcctgtc                                                      10

SEQ ID NO: 73          moltype = DNA  length = 10
FEATURE                Location/Qualifiers
misc_feature           1..10
                       note = Primer
source                 1..10
                       mol_type = other DNA
                       organism = synthetic construct
SEQUENCE: 73
ccccataggg                                                      10

SEQ ID NO: 74          moltype = DNA  length = 10
FEATURE                Location/Qualifiers
misc_feature           1..10
                       note = Primer
source                 1..10
                       mol_type = other DNA
                       organism = synthetic construct
SEQUENCE: 74
gctccaggga                                                      10

SEQ ID NO: 75          moltype = DNA  length = 10
FEATURE                Location/Qualifiers
misc_feature           1..10
                       note = Primer
source                 1..10
                       mol_type = other DNA
                       organism = synthetic construct
SEQUENCE: 75
ctgggatcag                                                      10

SEQ ID NO: 76          moltype = DNA  length = 10
FEATURE                Location/Qualifiers
misc_feature           1..10
                       note = Primer
source                 1..10
                       mol_type = other DNA
                       organism = synthetic construct
SEQUENCE: 76
cggcggccgc                                                      10

SEQ ID NO: 77          moltype = DNA  length = 10
FEATURE                Location/Qualifiers
misc_feature           1..10
                       note = Primer
source                 1..10
                       mol_type = other DNA
                       organism = synthetic construct
SEQUENCE: 77
ctggcatcac                                                      10

SEQ ID NO: 78          moltype = DNA  length = 10
FEATURE                Location/Qualifiers
misc_feature           1..10
                       note = Primer
source                 1..10
                       mol_type = other DNA
                       organism = synthetic construct
SEQUENCE: 78
gggagaagcg                                                      10

SEQ ID NO: 79          moltype = DNA  length = 10
FEATURE                Location/Qualifiers
misc_feature           1..10
                       note = Primer
source                 1..10
                       mol_type = other DNA
```

```
                      organism = synthetic construct
SEQUENCE: 79
cggtgagcag                                                                10

SEQ ID NO: 80         moltype = DNA  length = 10
FEATURE               Location/Qualifiers
misc_feature          1..10
                      note = Primer
source                1..10
                      mol_type = other DNA
                      organism = synthetic construct
SEQUENCE: 80
cacctcccgc                                                                10

SEQ ID NO: 81         moltype = DNA  length = 10
FEATURE               Location/Qualifiers
misc_feature          1..10
                      note = Primer
source                1..10
                      mol_type = other DNA
                      organism = synthetic construct
SEQUENCE: 81
tcagaggacc                                                                10

SEQ ID NO: 82         moltype = DNA  length = 10
FEATURE               Location/Qualifiers
misc_feature          1..10
                      note = Primer
source                1..10
                      mol_type = other DNA
                      organism = synthetic construct
SEQUENCE: 82
aggcgcggcg                                                                10

SEQ ID NO: 83         moltype = DNA  length = 10
FEATURE               Location/Qualifiers
misc_feature          1..10
                      note = Primer
source                1..10
                      mol_type = other DNA
                      organism = synthetic construct
SEQUENCE: 83
cccctcttgc                                                                10

SEQ ID NO: 84         moltype = DNA  length = 10
FEATURE               Location/Qualifiers
misc_feature          1..10
                      note = Primer
source                1..10
                      mol_type = other DNA
                      organism = synthetic construct
SEQUENCE: 84
cctcagtcac                                                                10

SEQ ID NO: 85         moltype = DNA  length = 10
FEATURE               Location/Qualifiers
misc_feature          1..10
                      note = Primer
source                1..10
                      mol_type = other DNA
                      organism = synthetic construct
SEQUENCE: 85
gacgtactgg                                                                10

SEQ ID NO: 86         moltype = DNA  length = 10
FEATURE               Location/Qualifiers
misc_feature          1..10
                      note = Primer
source                1..10
                      mol_type = other DNA
                      organism = synthetic construct
SEQUENCE: 86
tccagcgctt                                                                10

SEQ ID NO: 87         moltype = DNA  length = 10
FEATURE               Location/Qualifiers
misc_feature          1..10
                      note = Primer
source                1..10
```

```
                        mol_type = other DNA
                        organism = synthetic construct
SEQUENCE: 87
ccactagacg                                                   10

SEQ ID NO: 88           moltype = DNA  length = 10
FEATURE                 Location/Qualifiers
misc_feature            1..10
                        note = Primer
source                  1..10
                        mol_type = other DNA
                        organism = synthetic construct
SEQUENCE: 88
gatgggactg                                                   10

SEQ ID NO: 89           moltype = DNA  length = 10
FEATURE                 Location/Qualifiers
misc_feature            1..10
                        note = Primer
source                  1..10
                        mol_type = other DNA
                        organism = synthetic construct
SEQUENCE: 89
aggggccagt                                                   10

SEQ ID NO: 90           moltype = DNA  length = 10
FEATURE                 Location/Qualifiers
misc_feature            1..10
                        note = Primer
source                  1..10
                        mol_type = other DNA
                        organism = synthetic construct
SEQUENCE: 90
cccatcctca                                                   10

SEQ ID NO: 91           moltype = DNA  length = 10
FEATURE                 Location/Qualifiers
misc_feature            1..10
                        note = Primer
source                  1..10
                        mol_type = other DNA
                        organism = synthetic construct
SEQUENCE: 91
gggggtccta                                                   10

SEQ ID NO: 92           moltype = DNA  length = 10
FEATURE                 Location/Qualifiers
misc_feature            1..10
                        note = Primer
source                  1..10
                        mol_type = other DNA
                        organism = synthetic construct
SEQUENCE: 92
tggacagcac                                                   10

SEQ ID NO: 93           moltype = DNA  length = 10
FEATURE                 Location/Qualifiers
misc_feature            1..10
                        note = Primer
source                  1..10
                        mol_type = other DNA
                        organism = synthetic construct
SEQUENCE: 93
caccacgccc                                                   10

SEQ ID NO: 94           moltype = DNA  length = 10
FEATURE                 Location/Qualifiers
misc_feature            1..10
                        note = Primer
source                  1..10
                        mol_type = other DNA
                        organism = synthetic construct
SEQUENCE: 94
ggctagtggc                                                   10

SEQ ID NO: 95           moltype = DNA  length = 10
FEATURE                 Location/Qualifiers
misc_feature            1..10
                        note = Primer
```

```
source                  1..10
                        mol_type = other DNA
                        organism = synthetic construct
SEQUENCE: 95
aagtgctggg                                                    10

SEQ ID NO: 96           moltype = DNA  length = 10
FEATURE                 Location/Qualifiers
misc_feature            1..10
                        note = Primer
source                  1..10
                        mol_type = other DNA
                        organism = synthetic construct
SEQUENCE: 96
actagccacg                                                    10

SEQ ID NO: 97           moltype = DNA  length = 10
FEATURE                 Location/Qualifiers
misc_feature            1..10
                        note = Primer
source                  1..10
                        mol_type = other DNA
                        organism = synthetic construct
SEQUENCE: 97
tccgcccacc                                                    10

SEQ ID NO: 98           moltype = DNA  length = 10
FEATURE                 Location/Qualifiers
misc_feature            1..10
                        note = Primer
source                  1..10
                        mol_type = other DNA
                        organism = synthetic construct
SEQUENCE: 98
ctggttagcg                                                    10

SEQ ID NO: 99           moltype = DNA  length = 10
FEATURE                 Location/Qualifiers
misc_feature            1..10
                        note = Primer
source                  1..10
                        mol_type = other DNA
                        organism = synthetic construct
SEQUENCE: 99
acttctggcc                                                    10

SEQ ID NO: 100          moltype = DNA  length = 10
FEATURE                 Location/Qualifiers
misc_feature            1..10
                        note = Primer
source                  1..10
                        mol_type = other DNA
                        organism = synthetic construct
SEQUENCE: 100
ctctgtcccc                                                    10

SEQ ID NO: 101          moltype = DNA  length = 10
FEATURE                 Location/Qualifiers
misc_feature            1..10
                        note = Primer
source                  1..10
                        mol_type = other DNA
                        organism = synthetic construct
SEQUENCE: 101
gttggccagg                                                    10

SEQ ID NO: 102          moltype = DNA  length = 10
FEATURE                 Location/Qualifiers
misc_feature            1..10
                        note = Primer
source                  1..10
                        mol_type = other DNA
                        organism = synthetic construct
SEQUENCE: 102
gcggcgttgg                                                    10

SEQ ID NO: 103          moltype = DNA  length = 10
FEATURE                 Location/Qualifiers
misc_feature            1..10
```

```
                        note = Primer
source                  1..10
                        mol_type = other DNA
                        organism = synthetic construct
SEQUENCE: 103
cacgcagcac                                                        10

SEQ ID NO: 104          moltype = DNA  length = 10
FEATURE                 Location/Qualifiers
misc_feature            1..10
                        note = Primer
source                  1..10
                        mol_type = other DNA
                        organism = synthetic construct
SEQUENCE: 104
tgctgatggg                                                        10

SEQ ID NO: 105          moltype = DNA  length = 10
FEATURE                 Location/Qualifiers
misc_feature            1..10
                        note = Primer
source                  1..10
                        mol_type = other DNA
                        organism = synthetic construct
SEQUENCE: 105
gtagctggga                                                        10

SEQ ID NO: 106          moltype = DNA  length = 10
FEATURE                 Location/Qualifiers
misc_feature            1..10
                        note = Primer
source                  1..10
                        mol_type = other DNA
                        organism = synthetic construct
SEQUENCE: 106
aagcccctgg                                                        10

SEQ ID NO: 107          moltype = DNA  length = 10
FEATURE                 Location/Qualifiers
misc_feature            1..10
                        note = Primer
source                  1..10
                        mol_type = other DNA
                        organism = synthetic construct
SEQUENCE: 107
ctcctgcctc                                                        10

SEQ ID NO: 108          moltype = DNA  length = 10
FEATURE                 Location/Qualifiers
misc_feature            1..10
                        note = Primer
source                  1..10
                        mol_type = other DNA
                        organism = synthetic construct
SEQUENCE: 108
gggcacgctg                                                        10

SEQ ID NO: 109          moltype = DNA  length = 10
FEATURE                 Location/Qualifiers
misc_feature            1..10
                        note = Primer
source                  1..10
                        mol_type = other DNA
                        organism = synthetic construct
SEQUENCE: 109
cctccagggt                                                        10

SEQ ID NO: 110          moltype = DNA  length = 10
FEATURE                 Location/Qualifiers
misc_feature            1..10
                        note = Primer
source                  1..10
                        mol_type = other DNA
                        organism = synthetic construct
SEQUENCE: 110
agatgacgcc                                                        10

SEQ ID NO: 111          moltype = DNA  length = 10
FEATURE                 Location/Qualifiers
```

```
misc_feature            1..10
                        note = Primer
source                  1..10
                        mol_type = other DNA
                        organism = synthetic construct
SEQUENCE: 111
cttggctcac                                                               10

SEQ ID NO: 112          moltype = DNA  length = 10
FEATURE                 Location/Qualifiers
misc_feature            1..10
                        note = Primer
source                  1..10
                        mol_type = other DNA
                        organism = synthetic construct
SEQUENCE: 112
cttccctccc                                                               10

SEQ ID NO: 113          moltype = DNA  length = 10
FEATURE                 Location/Qualifiers
misc_feature            1..10
                        note = Primer
source                  1..10
                        mol_type = other DNA
                        organism = synthetic construct
SEQUENCE: 113
tggcccaggc                                                               10

SEQ ID NO: 114          moltype = DNA  length = 10
FEATURE                 Location/Qualifiers
misc_feature            1..10
                        note = Primer
source                  1..10
                        mol_type = other DNA
                        organism = synthetic construct
SEQUENCE: 114
ccttcagctc                                                               10

SEQ ID NO: 115          moltype = DNA  length = 10
FEATURE                 Location/Qualifiers
misc_feature            1..10
                        note = Primer
source                  1..10
                        mol_type = other DNA
                        organism = synthetic construct
SEQUENCE: 115
caacgtgagg                                                               10

SEQ ID NO: 116          moltype = DNA  length = 10
FEATURE                 Location/Qualifiers
misc_feature            1..10
                        note = Primer
source                  1..10
                        mol_type = other DNA
                        organism = synthetic construct
SEQUENCE: 116
ggcccggcct                                                               10

SEQ ID NO: 117          moltype = DNA  length = 10
FEATURE                 Location/Qualifiers
misc_feature            1..10
                        note = Primer
source                  1..10
                        mol_type = other DNA
                        organism = synthetic construct
SEQUENCE: 117
gcgacatggg                                                               10

SEQ ID NO: 118          moltype = DNA  length = 10
FEATURE                 Location/Qualifiers
misc_feature            1..10
                        note = Primer
source                  1..10
                        mol_type = other DNA
                        organism = synthetic construct
SEQUENCE: 118
ctgggtctcc                                                               10

SEQ ID NO: 119          moltype = DNA  length = 10
```

```
FEATURE                 Location/Qualifiers
misc_feature            1..10
                        note = Primer
source                  1..10
                        mol_type = other DNA
                        organism = synthetic construct
SEQUENCE: 119
tccatggtgg                                                            10

SEQ ID NO: 120          moltype = DNA  length = 10
FEATURE                 Location/Qualifiers
misc_feature            1..10
                        note = Primer
source                  1..10
                        mol_type = other DNA
                        organism = synthetic construct
SEQUENCE: 120
cgagccccgc                                                            10

SEQ ID NO: 121          moltype = DNA  length = 10
FEATURE                 Location/Qualifiers
misc_feature            1..10
                        note = Primer
source                  1..10
                        mol_type = other DNA
                        organism = synthetic construct
SEQUENCE: 121
ccagtggctc                                                            10

SEQ ID NO: 122          moltype = DNA  length = 10
FEATURE                 Location/Qualifiers
misc_feature            1..10
                        note = Primer
source                  1..10
                        mol_type = other DNA
                        organism = synthetic construct
SEQUENCE: 122
gcccgaaggc                                                            10

SEQ ID NO: 123          moltype = DNA  length = 10
FEATURE                 Location/Qualifiers
misc_feature            1..10
                        note = Primer
source                  1..10
                        mol_type = other DNA
                        organism = synthetic construct
SEQUENCE: 123
tgctgcaagg                                                            10

SEQ ID NO: 124          moltype = DNA  length = 30
FEATURE                 Location/Qualifiers
misc_feature            1..30
                        note = Primer
source                  1..30
                        mol_type = other DNA
                        organism = synthetic construct
SEQUENCE: 124
actttcaact ctgtctcctt cctcttccta                                      30

SEQ ID NO: 125          moltype = DNA  length = 14
FEATURE                 Location/Qualifiers
misc_feature            1..14
                        note = Primer
source                  1..14
                        mol_type = other DNA
                        organism = synthetic construct
SEQUENCE: 125
ggacgcgggt gccg                                                       14

SEQ ID NO: 126          moltype = DNA  length = 16
FEATURE                 Location/Qualifiers
misc_feature            1..16
                        note = Primer
source                  1..16
                        mol_type = other DNA
                        organism = synthetic construct
SEQUENCE: 126
aagcggcggc agagcg                                                     16
```

-continued

```
SEQ ID NO: 127         moltype = DNA  length = 21
FEATURE                Location/Qualifiers
misc_feature           1..21
                       note = Primer
source                 1..21
                       mol_type = other DNA
                       organism = synthetic construct
SEQUENCE: 127
tctgggagcc tgtggctgaa g                                        21

SEQ ID NO: 128         moltype = DNA  length = 27
FEATURE                Location/Qualifiers
misc_feature           1..27
                       note = Primer
source                 1..27
                       mol_type = other DNA
                       organism = synthetic construct
SEQUENCE: 128
atgcatccct gtgtaagtgc attttgg                                  27

SEQ ID NO: 129         moltype = DNA  length = 35
FEATURE                Location/Qualifiers
misc_feature           1..35
                       note = Primer
source                 1..35
                       mol_type = other DNA
                       organism = synthetic construct
SEQUENCE: 129
gcgtgtctta aaaatttcaa aaaatgttgg cctct                         35
```

MULTIFUNCTIONAL MICROFLUIDIC DEVICE FOR CAPTURING TARGET CELLS AND ANALYZING GENOMIC DNA ISOLATED FROM THE TARGET CELLS WHILE UNDER FLOW CONDITIONS

CROSS-REFERENCE TO RELATED APPLICATIONS

This application is a continuation of U.S. patent application Ser. No. 16/303,658, filed Nov. 20, 2018, now U.S. Pat. No. 11,602,747, issued Mar. 14, 2023, which is a U.S. National Phase filing under 35 U.S.C. § 371 of International Application No. PCT/US2017/033789, filed May 22, 2017, and published as WO 2017/205267 A1 on Nov. 30, 2017, which claims priority benefit of U.S. Provisional Patent Application Ser. No. 62/339,924, filed May 22, 2016, the disclosures of which are hereby incorporated by reference herein in their entirety.

GOVERNMENT RIGHTS STATEMENT

This invention was made with Government support under grant number DA030329 awarded by the National Institutes of Health. The United States Government has certain rights in the invention.

REFERENCE TO AN ELECTRONIC SEQUENCE LISTING

The contents of the electronic sequence listing (20230530_SequenceListing_ST26_6377021US2.xml; Size: 161,352 bytes; and Date of Creation: May 30, 2023) is herein incorporated by reference in its entirety.

FIELD OF THE INVENTION

The present invention relates to, inter alia, a microfluidic device for capturing target cells and analyzing genomic DNA isolated from the target cells while under flow conditions.

BACKGROUND OF THE INVENTION

Cancer cells contain genetic mutations that allow them to escape the regulatory processes necessary for the healthy function of tissues and organs.[1-3] Moreover, there are numerous mechanisms for malignancy with different combinations of genetic mutations, and cancer cells are constantly evolving,[4] which makes cancer treatment difficult with varying levels of efficacy. Many assays have been developed that detect specific mutations, whereas some have been designed to detect all mutations via sequencing.[5-10] Each of these approaches has advantages and disadvantages.[8] Most of these assays also require significant sample preparation to be performed in a bulk solution where the initial amount of genetic material is limited, some is lost in processing, and the remaining material is used up quickly. Therefore, an assay that incorporates sample preparation and enables the original genetic template to be reused would be highly advantageous.

Aptamers are short single-stranded nucleic acids with structures determined by their specific nucleotide sequence. These molecules bind with high affinity and specificity to their intended targets. Aptamers are typically discovered by an iterative process called Systematic Evolution of Ligands by EXponential enrichment (SELEX) in which they are selected from a very large, sequence-diverse library of nucleic acids ($10^{12}$-$10^{16}$ unique sequences).[11-13] Cell-SELEX was developed more recently to select aptamers that bind specifically to a certain type of cell.[14,15] Using this technique, aptamers that bind specifically to cells of interest can be determined without any prior knowledge about the surface composition of the cells. Consequently, this method can be used to discover affinity ligands that bind to cancer cells.[16-18]

Many assays and devices are being developed that capture and isolate circulating tumor cells (CTCs), and although antibodies are traditionally used, aptamer-based CTC capture is also being performed.[19-24] Aptamers have been used over antibodies in these types of applications because of their increased robustness and ease of functionalization and oriented immobilization. The Tan group has developed several devices for capturing CTCs in which the aptamers are biotinylated and simply immobilized within the device by binding to streptavidin adsorbed on the channel surface.[20,22,23,25,26]

A device for extracting and purifying human chromosomal DNA from lysed cells was previously developed.[27] This device incorporated a fine micropillar array that captured megabase-long genomic DNA (gDNA) strands via physical entanglement. The physical nature of this isolation enables the gDNA to be isolated without dependence on biochemical or electrostatic forces, making it available for downstream reactions. This also allows the gDNA to remain on the micropillar array during flow, which allows downstream analyses to be performed within the microdevice.

Genetic mutations in cancer cells are not only fundamental to the disease, but can also have tremendous impact on the efficacy of treatment. Identification of specific key mutations in a timely and cost-effective way would allow clinicians to better prescribe the most effective treatment options. Furthermore, cancer cells are constantly evolving, so regular testing of multiple important genes is also beneficial for monitoring disease progression and future treatment.

There is a need for new and improved technologies for studying cancer and particularly for detecting and understanding genetic mutations implicated in various cancers. This is also a need for additional methods of detecting and treating cancer.

The present invention is directed to overcoming these and other deficiencies in the art.

SUMMARY OF THE INVENTION

The present invention provides, inter alia, a combination of microfluidic and aptamer technologies suitable for use in studying, analyzing, detecting, and treating various conditions and diseases. In particular, the present invention provides a microfluidic device for aptamer-based cancer cell capture and genetic mutation detection, and the use of the microfluidic device for various applications.

In one aspect, the present invention provides a microfluidic device comprising: a cell microchannel and a nucleic acid microchannel that intersect to form a cell capture intersection region; a cell capture array comprising a plurality of cell capturing micropillars configured and arranged in a manner effective to capture one or more target cell when flowed through the cell microchannel, said cell capture array being located in the cell capture intersection region; and a nucleic acid entanglement array comprising a plurality of nucleic acid entanglement micropillars configured and arranged in a manner effective to physically entangle and maintain thereon genomic DNA isolated from the one or more target cell, said nucleic acid entanglement array being located in a portion of the nucleic acid microchannel that is adjacent to and downstream of the cell capture intersection region. The microfluidic device is multi-functional in that it is effective for capturing said one or more target cell, isolating said genomic DNA from the one or more target cell, and analyzing said genomic DNA in a self-contained manner.

In one embodiment, the microfluidic device of the present invention further comprises a first flow rate means for managing rate of flow of fluid through the cell microchannel and a second flow rate means for managing rate of flow of fluid through the nucleic acid microchannel.

In another embodiment, the microfluidic device of the present invention further comprises a temperature controller for managing temperature of fluid and other contents contained within the cell microchannel and/or nucleic acid microchannel.

In another aspect, the present invention provides a method of isolating and maintaining genomic DNA of one or more target cell from a sample under flow for further analysis thereof. This method involves the steps of: providing a microfluidic device as described herein; introducing a sample comprising one or more target cell into the cell microchannel at a flow rate effective to transport the one or more target cell to the cell capture array so as to capture the one or more target cell in the cell capturing micropillars by specific binding; lysing the one or more target cell by introducing lysing reagents through the nucleic acid microchannel at a flow rate effective to release genomic DNA from the one or more target cell without shearing the genomic DNA; and maintaining fluid flow within the nucleic acid microchannel at a flow rate effective to cause the released genomic DNA to become physically entangled and maintained within the nucleic acid entanglement array for further analysis thereof.

In another aspect, the present invention provides a method for conducting aptamer-based cancer cell capture and genomic DNA mutation analysis of genomic DNA isolated from one or more target cell. This method includes the steps of: performing the steps described herein of the method of isolating and maintaining genomic DNA of one or more target cell from a sample under flow; and conducting aptamer-based cancer cell capture and genomic DNA mutation analysis of the genomic DNA isolated from one or more target cell while in a flow environment within the microfluidic device.

In another aspect, the present invention provides a method for amplifying individual genes of interest from the one or more target cell consecutively and collecting each amplification product separately. This method includes the steps of: performing the steps described herein of the method of isolating and maintaining genomic DNA of one or more target cell from a sample under flow; and amplifying individual genes of interest from the genomic DNA entangled and maintained under flow within the nucleic acid entanglement array of the microfluidic device consecutively and collecting each amplification product separately.

In another aspect, the present invention provides a method for sequencing nucleic acids amplified from genomic DNA isolated from one or more target cell. This method includes the steps of: performing the steps described herein of the method of isolating and maintaining genomic DNA of one or more target cell from a sample under flow; and sequencing the genomic DNA entangled and maintained under flow within the nucleic acid entanglement array of the microfluidic device.

In another aspect, the present invention provides a method for multiple displacement amplification (MDA) reactions of one or more nucleic acid sequence isolated from one or more target cell. This method includes the steps of: performing the steps described herein of the method of isolating and maintaining genomic DNA of one or more target cell from a sample under flow; and conducting multiple displacement amplification (MDA) reactions under flow using the genomic DNA entangled and maintained within the nucleic acid entanglement array of the microfluidic device.

In one aspect, the present invention relates to a novel microfluidic device that provides a platform for specifically capturing cancer cells and isolating the genomic DNA for specific amplification and sequence analysis. In one embodiment of the present invention, in order to filter out rare cancer cells from a complex mixture containing a diversity of cells, nucleic acid aptamers that specifically bind to cancer cells are immobilized within a microchannel containing pillars to increase the number of collisions with the surface and improve capture efficiency. The captured cells are then lysed and the genomic DNA is isolated via physical entanglement within a secondary micropillar array. This type of isolation enables multiple consecutive rounds of isothermal amplification to be performed to amplify different individual genes separately, since the genomic template is retained on the micropillars between subsequent amplifications. The amplified gene samples undergo Sanger sequencing, an inexpensive sequencing approach requiring a pure sample, to reveal the genetic sequence. The resulting sequence information is compared against the known wild-type gene, and any mutations are identified. This approach offers a way to monitor multiple genetic mutations in the same small population of cells, which is beneficial given the wide diversity in cancer cells, and requires very few cells to be extracted from the patient sample. With this capability for genetic monitoring, precision medicine should be more accessible for the diagnosis and treatment of cancer and other diseases.

One advantage of the microfluidic device of the present invention over the prior art is the combination of microfluidic aptamer-based cell capturing technology (e.g., high surface area microfluidic device for capturing selected cells by specific binding) with the elongation/capture/analysis of nucleic acids isolated from the captured cells (e.g., using small pillars or capture structures). As shown, the microfluidic device combines these technologies into a single, integrated device in a manner that is unique over the prior art technologies.

The microfluidic device of the present invention is unique over the prior art for a variety of reasons. For example, the design of a microfluidic device of the present invention is such that it can be fabricated as integrated unit, which is unique over the prior art which involves the use of separate devices, which have different requirements for their construction. Further, the operation of two, separate devices (as in the case of the prior art) would require sample extraction from one device and then sample preparation and then insertion into the other device. This would be very inefficient and cause the loss of portions of the sample being studied, as well as opening the process up to contamination. Being able to use the current devices of the prior art does not inform one how to operate an integrated unit such as the one of the present invention, where all processes must be carried out on a chip with no valves or separate sample processing devices between them.

To date, there are no known reports in the prior art of the transfer of whole genomic DNA from one device to another as would be required in the use of the microfluidic device of the present invention, where cells are selectively captured, DNA extracted and moved to a separate region of a device for sequence specific selective amplification.

In accordance with another aspect, the present invention provides a process for preparing a microfluidic device according to the present invention, said process comprising steps as disclosed and/or contemplated herein.

In accordance with aspects of the present invention, there is provided a device capable of specifically capturing cancer cells, isolating their gDNA, and amplifying specific genes for sequencing to determine the presence of any genetic mutations in those genes. The cancer cells are captured using aptamers immobilized on the microchannel surface, and the gDNA is isolated via physical entanglement within a micropillar array. We developed a modified version of multiple displacement amplification (MDA), an isothermal DNA amplification technique, that amplifies a specific gene of interest. This amplification product undergoes sequencing, and the resulting sequence is compared to the known human genome to determine the presence of any genetic mutations. Identification of specific key mutations in a timely and cost-effective way would allow clinicians to better prescribe the most effective treatment options. Furthermore, since cancer cells are constantly evolving, regular testing of multiple important genes is also beneficial for monitoring disease progression and determining future treatment. The ability to perform this regular testing in a cost-effective manner would encourage more frequent testing, which would likely improve overall treatment efficacy.

These and other objects, features, and advantages of this invention will become apparent from the following detailed description of the various aspects of the invention taken in conjunction with the accompanying drawings.

BRIEF DESCRIPTION OF THE DRAWINGS

For the purpose of illustrating aspects of the present invention, there are depicted in the drawings certain embodiments of the invention. However, the invention is not limited to the precise arrangements and instrumentalities of the embodiments depicted in the drawings. Further, as provided, like reference numerals contained in the drawings are meant to identify similar or identical elements.

FIG. 4A and FIG. 4B show the device without aptamers after flowing HeLa and CAOV-3 cells, respectively, through the microchannel. FIG. 4C and FIG. 4D show the device containing aptamers after flowing Ect1/E6E7 and End1/E6E7 cells, respectively, through the microchannel. FIG. 4E and FIG. 4F show the device containing aptamers after flowing HeLa and CAOV-3 cells, respectively, through the microchannel. FIG. 4C shows fluorescent images of the cell capture region without aptamers after flowing CAOV-3 cells through the microchannels. The HeLa cells fluoresce due to GFP bound to their histones, and the CAOV-3, Ect1/E6E7, and End1/E6E7 cells were stained with calcein-AM.

FIG. 5A: Fluorescent image of HeLa cells bound to aptamers in the cell capture region. FIG. 5B: Fluorescent image of gDNA from HeLa cells isolated by the micropillar array and stained with YOYO-1 dye. FIG. 5C: Fluorescent image of CAOV-3 cells stained with calcein-AM and bound to aptamers in the cell capture region. FIG. 5D: Fluorescent image of gDNA from CAOV-3 cells isolated by the micropillar array and stained with YOYO-1 dye.

FIG. 6A: MDA product from reactions using 15 ng of purified HeLa gDNA. Different quantities of primers were tested, as well as negative controls containing no gDNA template. The MDA product was run on a 1% agarose gel and was approximately 10 kb. FIG. 6B: PCR product from reactions amplifying a shorter TP53 gene fragment using 60% of the MDA product. The PCR product was run on a 2.5% agarose gel and was 130 nt in length. FIG. 6C: On-chip MDA product from isolated HeLa and CAOV-3 cell gDNA verified using a 1% agarose gel. The ladder indicates that the product was around 10 kb in length. FIG. 6D: PCR product verified via 8% PAGE. The ladder confirmed a product length of 130 bp.

FIG. 7A: Wildtype sequence for the TP53 region is shown and was obtained from the International Agency for Research on Cancer. Sequencing results for the HeLa cell TP53 region are shown. FIG. 7B: Mutant sequence for the known SNP in CAOV-3 cells where a C is replaced by a T. Sequencing results for the CAOV-3 cell TP53 region are shown. The specific base that is mutated is underlined.

FIG. 12: Sanger sequencing results indicating the point mutation in the TP53 gene in CAOV-3 cells. The wildtype sequence (SEQ ID NO:1) for this fragment of the TP53 gene is shown at the top of the figure. The upper plot shows the sequencing results for this gene fragment (SEQ ID NO:2) for HeLa cells. The lower plot shows the sequencing results for this gene fragment (SEQ ID NO:3) for CAOV-3 cells. The yellow box highlights the region where the mutation is located, and the base that is mutated is underlined in black. Some bases were not called by the sequencing software, but the bases can be determined by looking at the plot peaks.

DETAILED DESCRIPTION OF THE INVENTION

Figure 1:
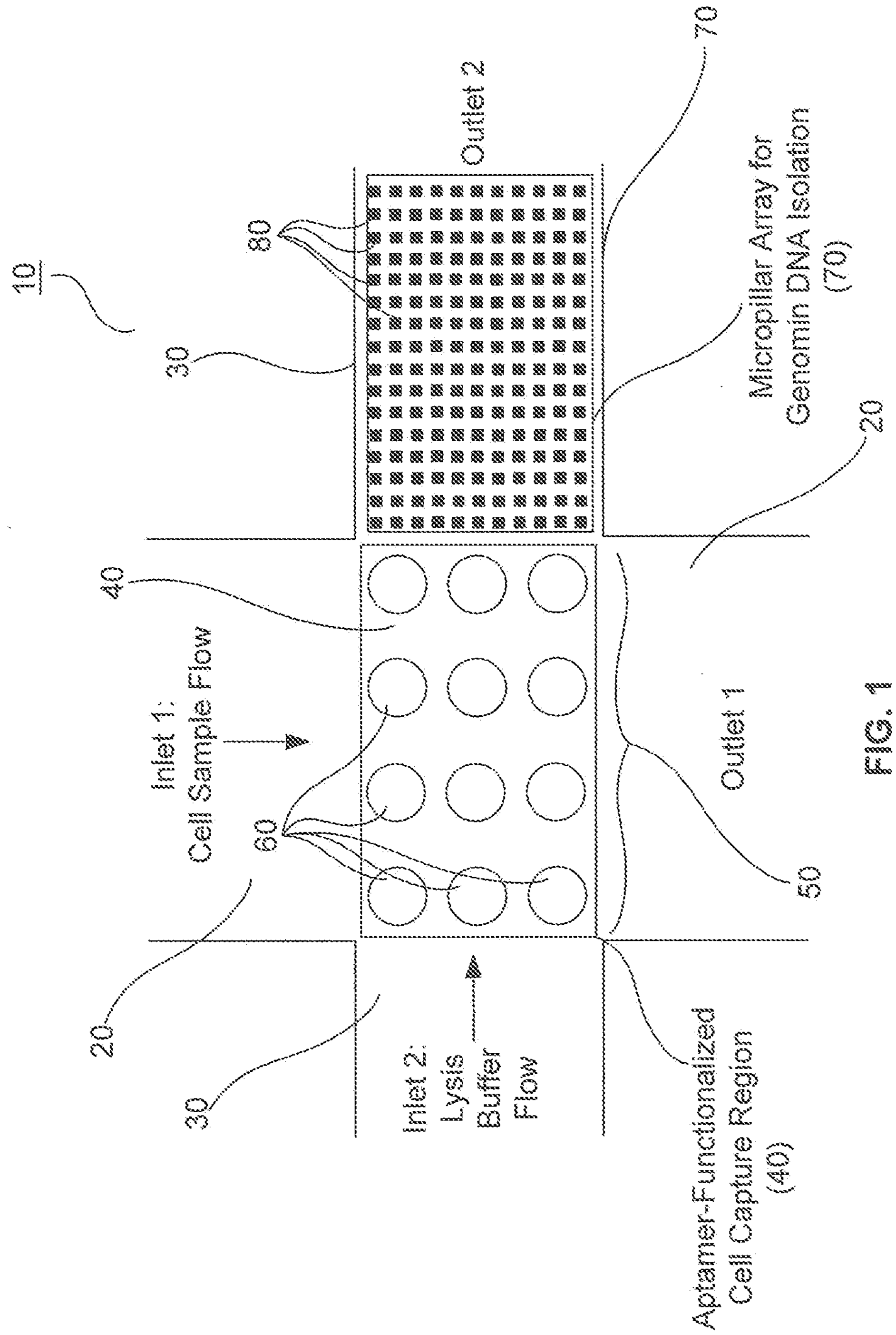
FIG. 1: Schematic of portions of one embodiment of the microfluidic device of the present disclosure. Two intersecting microchannels with an aptamer-functionalized pillar array at the intersection for specific cancer cell capture. A finer micropillar array downstream for genomic DNA isolation via physical entanglement. The initial cell sample is injected into Inlet 1, flows through the capture region, and out Outlet 1. The lysis buffer is injected into Inlet 2, and the genomic DNA is entangled in the micropillar array, while the rest of the lysate flows out of the device through Outlet 2.

The present invention relates to, inter alia, a combination of microfluidic and aptamer technologies suitable for use in studying, analyzing, detecting, and treating various conditions and diseases.

More particularly, in one aspect, the present invention relates to a microfluidic device for aptamer-based cancer cell capture and genetic mutation detection, and the use of the microfluidic device for various applications.

In one aspect, the present invention provides a microfluidic device comprising: a cell microchannel and a nucleic acid microchannel that intersect to form a cell capture intersection region; a cell capture array comprising a plurality of cell capturing micropillars configured and arranged in a manner effective to capture one or more target cell when flowed through the cell microchannel, said cell capture array being located in the cell capture intersection region; and a nucleic acid entanglement array comprising a plurality of nucleic acid entanglement micropillars configured and arranged in a manner effective to physically entangle and maintain thereon genomic DNA isolated from the one or more target cell, said nucleic acid entanglement array being located in a portion of the nucleic acid microchannel that is adjacent to and downstream of the cell capture intersection region. The microfluidic device is multi-functional in that it is effective for capturing said one or more target cell, isolating said genomic DNA from the one or more target cell, and analyzing said genomic DNA in a self-contained manner.

In one embodiment of the microfluidic device of the present invention, the cell capture array comprises one or more aptamer and/or another cell capture component specific to the one or more target cell.

In another embodiment, the one or more aptamer and/or another cell capture component is concentrated in the cell capture intersection region, thereby enabling capture of the one or more target cell.

In another embodiment, the nucleic acid entanglement array is effective to entangle and maintain the isolated genomic DNA for single amplification and/or multiple, consecutive amplifications of one or more nucleic acid sequence of interest contained on the isolated genomic DNA.

In certain embodiments, the one or more nucleic acid sequence of interest is a cancer gene. In other embodiments, the one or more target cell is a cancer cell.

In one embodiment, the microfluidic device of the present invention further comprises a first flow rate means for managing rate of flow of fluid through the cell microchannel and a second flow rate means for managing rate of flow of fluid through the nucleic acid microchannel.

In another embodiment, the first flow rate means comprises external valves at the nucleic acid microchannel inlet and outlet and the second flow rate means comprises external valves at the cell microchannel inlet and outlet.

In one embodiment, the external valves are selected from the group consisting of two-way valves and four-way valves.

In another embodiment, the microfluidic device of the present invention further comprises a temperature controller for managing temperature of fluid and other contents contained within the cell microchannel and/or nucleic acid microchannel.

In one embodiment, the cell microchannel and the nucleic acid microchannel have a height ranging from between about 20 μm and about 40 μm.

In one embodiment, the cell microchannel and the nucleic acid microchannel have a height of about 20, 21, 22, 23, 24, 25, 26, 27, 28, 29, 30, 31, 32, 33, 34, 35, 36, 37, 38, 39, or 40 μm.

In one embodiment, the cell microchannel and the nucleic acid microchannel have a height of about 25 μm.

In one embodiment, the cell channel has a width ranging from between about 500 μm and about 1500 μm.

In one embodiment, the cell channel has a width of about 500, 510, 520, 530, 540, 550, 560, 570, 580, 590, 600, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 μm.

In one embodiment, the cell channel has a width of about 1000 μm.

In one embodiment, the nucleic acid channel has a width ranging from between about 200 μm and about 1500 μm.

In one embodiment, the nucleic acid channel has a width selected from the group consisting of about 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, 1490, or 1500 μm.

In one embodiment, the nucleic acid channel has a width selected from the group consisting of about 250 μm, 500 μm, and 1000 μm.

In one embodiment, the cell capturing micropillars have a diameter ranging from between about 40 μm and about 60 μm.

In one embodiment, the cell capturing micropillars have a diameter of about 40, 41, 42, 43, 44, 45, 46, 47, 48, 49, 50, 51, 52, 53, 54, 55, 56, 57, 58, 59, or 60 μm.

In one embodiment, the cell capturing micropillars have a diameter of about 50 μm.

In one embodiment, the cell capture array is ordered in a patterned array that is rotated by about 4° to maximize contact between the one or more target cell and microchannel surface.

In one embodiment, the nucleic acid entanglement micropillars have a diameter ranging from between about 2 μm and about 10 μm.

In one embodiment, the nucleic acid entanglement micropillars have a diameter of about 2.0, 2.5, 3.0, 3.5, 4.0, 4.5, 5.0, 5.5, 6.0, 6.5, 7.0, 7.5, 8.0, 8.5, 9.0, 9.5, or 10 μm.

In one embodiment, the nucleic acid entanglement micropillars have a cross-sectional dimension of about 4 μm×4 μm, wherein said nucleic acid entanglement micropillars are spaced in a gradient that begins with the micropillars being about 10 μm apart and ending with the micropillars being about 7 μm apart.

In another aspect, the present invention provides a method of isolating and maintaining genomic DNA of one or more target cell from a sample under flow for further analysis thereof. This method involves the steps of: providing a microfluidic device as described herein; introducing a sample comprising one or more target cell into the cell microchannel at a flow rate effective to transport the one or more target cell to the cell capture array so as to capture the one or more target cell in the cell capturing micropillars by specific binding; lysing the one or more target cell by introducing lysing reagents through the nucleic acid microchannel at a flow rate effective to release genomic DNA from the one or more target cell without shearing the genomic DNA; and maintaining fluid flow within the nucleic acid microchannel at a flow rate effective to cause the released genomic DNA to become physically entangled and maintained within the nucleic acid entanglement array for further analysis thereof.

In one embodiment, the one or more target cell is captured in the cell capture array due to specific contact with an aptamer or other capture component present in the cell capture array.

In one embodiment, the one or more target cell is introduced into the cell microchannel and thereafter captured within the cell capture array under a flow rate ranging from between about 0.1 μL/minute and about 20 μL/minute.

In one embodiment, the one or more target cell is introduced into the cell microchannel and thereafter captured within the cell capture array under a flow rate of about 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 μL/minute.

In one embodiment, the lysing reagents are introduced through the nucleic acid microchannel at a flow rate ranging from between about 0.1 μL/minute and about 2 μL/minute, thereby causing the release of the genomic DNA from the one or more target cell without shearing the genomic DNA.

In one embodiment, the flow of fluid in the nucleic acid microchannel is maintained at a flow rate ranging from between about 0.05 μL/minute and about 2 μL/minute, thereby causing the released genomic DNA to become physically entangled and maintained within the nucleic acid entanglement array.

In one embodiment, the one or more target cell is a cancer cell, although the present invention can be used for any type of cell of structure that contains DNA or genomic DNA.

In another aspect, the present invention provides a method for conducting aptamer-based cancer cell capture and genomic DNA mutation analysis of genomic DNA isolated from one or more target cell. This method includes the steps of: performing the steps described herein of the method of isolating and maintaining genomic DNA of one or more target cell from a sample under flow; and conducting aptamer-based cancer cell capture and genomic DNA mutation analysis of the genomic DNA isolated from one or more target cell while in a flow environment within the microfluidic device.

In another aspect, the present invention provides a method for amplifying individual genes of interest from the one or more target cell consecutively and collecting each amplification product separately. This method includes the steps of: performing the steps described herein of the method of isolating and maintaining genomic DNA of one or more target cell from a sample under flow; and amplifying individual genes of interest from the genomic DNA entangled and maintained under flow within the nucleic acid entanglement array of the microfluidic device consecutively and collecting each amplification product separately.

In another aspect, the present invention provides a method for sequencing nucleic acids amplified from genomic DNA isolated from one or more target cell. This method includes the steps of: performing the steps described herein of the method of isolating and maintaining genomic DNA of one or more target cell from a sample under flow; and sequencing the genomic DNA entangled and maintained under flow within the nucleic acid entanglement array of the microfluidic device.

In another aspect, the present invention provides a method for multiple displacement amplification (MDA) reactions of one or more nucleic acid sequence isolated from one or more target cell. This method includes the steps of: performing the steps described herein of the method of isolating and maintaining genomic DNA of one or more target cell from a sample under flow; and conducting multiple displacement amplification (MDA) reactions under flow using the genomic DNA entangled and maintained within the nucleic acid entanglement array of the microfluidic device.

In one embodiment, the MDA reactions involve using the same genomic DNA template isolated by the nucleic acid entanglement micropillars of the microfluidic device.

Figure 2:
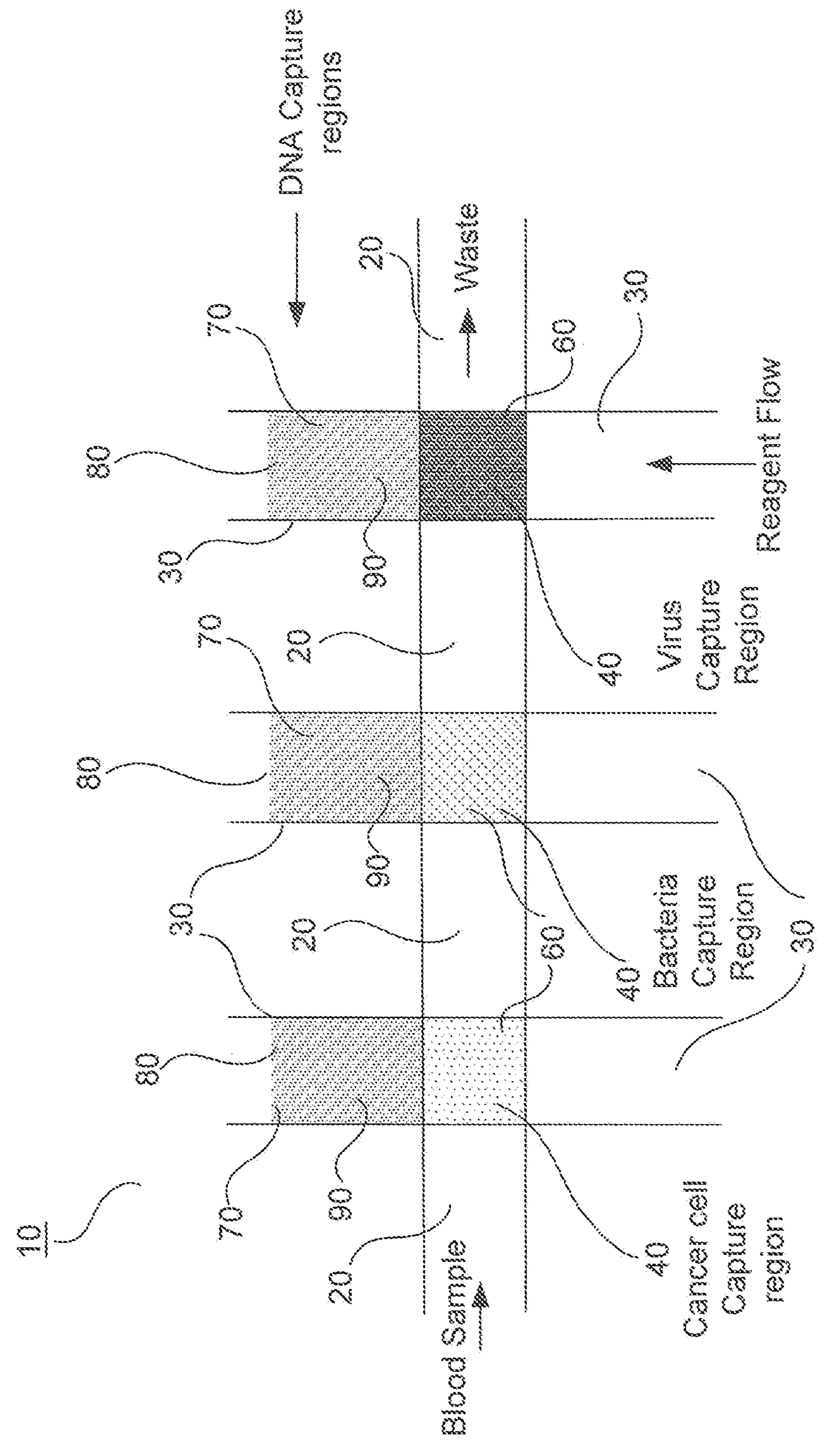
FIG. 2: Schematic of one embodiment of a microfluidic device of the present disclosure. The embodiment illustrates microfluidic channels for capture of different biological components from a sample.
Figure 3:
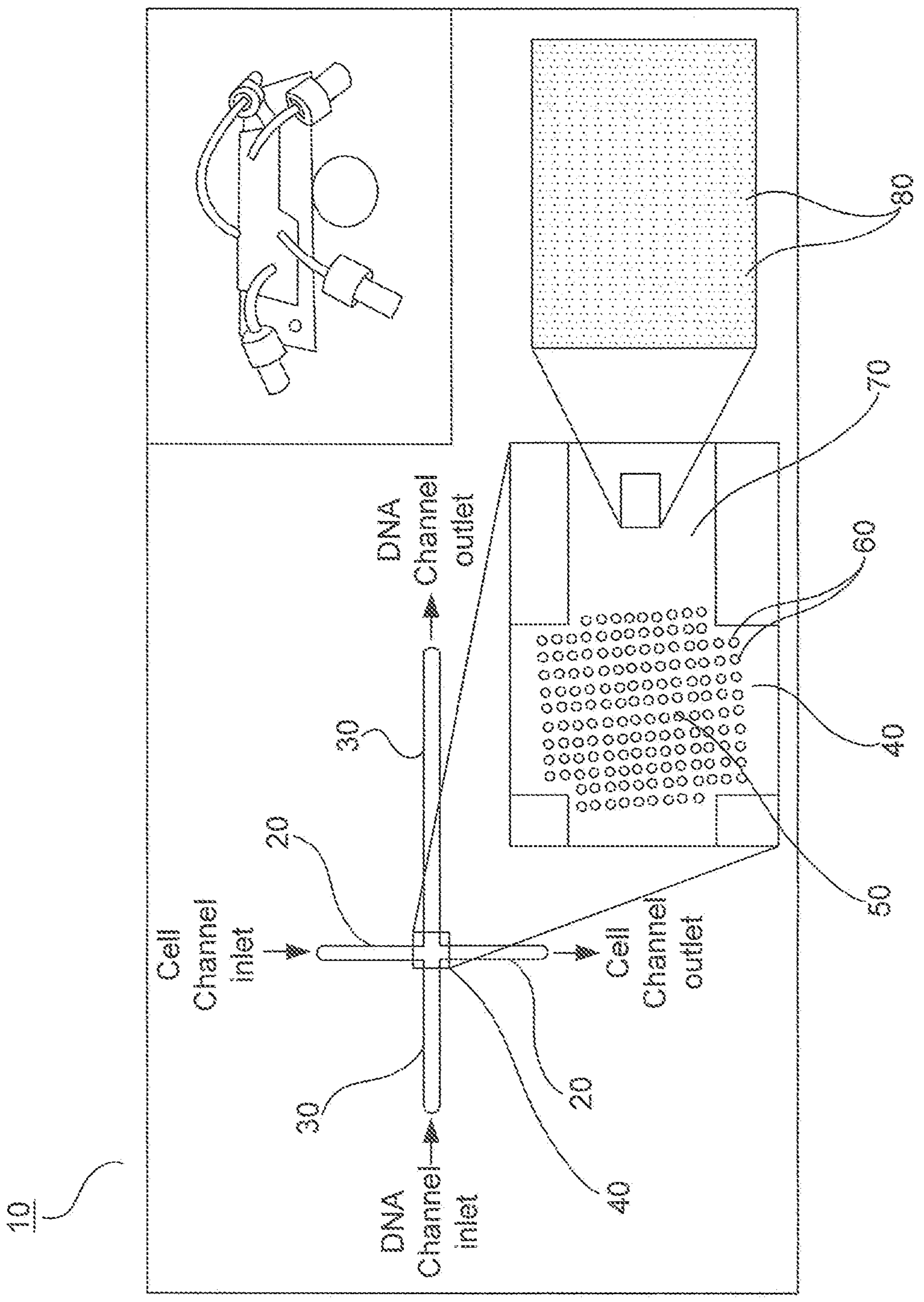
FIG. 3: Microchannel design for capturing cancer cells and isolating their gDNA. The device contains two orthogonal channels, the cell channel and the DNA channel. It also contains two micropillar arrays, the cell capture array located at the intersection of the channels (red box, scale bar: 200 μm) and the DNA isolation array located downstream of the cell capture array in the DNA channel (blue box, scale bar: 20 μm). An image of the device is also displayed in the upper right corner.

FIGS. 1-3 provide schematic views of illustrative embodiments and aspects of the microfluidic device of the present invention. While the aforementioned figures relate to and are further described below and in the examples also provided herein below, these figures are helpful in describing the microfluidic device and any related systems and methods in general terms.

FIG. 1 and FIG. 3 are schematic illustrations aspects of one embodiment of microfluidic device 10 of the present disclosure. In particular, FIG. 1 and FIG. 3 illustrate microfluidic device 10 as having cell microchannel 20 and nucleic acid microchannel 30, which intersect to form cell capture intersection region 40. Microfluidic device 10 is also shown to include cell capture array 50, which includes a plurality of cell capturing micropillars 60 configured and arranged in a manner effective to capture one or more target cell when such cells are flowed through cell microchannel 20. Cell capture array 50 is located in cell capture intersection region 40. Microfluidic device 10 is also shown to include nucleic acid entanglement array 70, which includes a plurality of nucleic acid entanglement micropillars 80 configured and arranged in a manner effective to physically entangle and maintain thereon genomic DNA isolated from the one or more target cell. Nucleic acid entanglement array 70 is located in a portion of nucleic acid microchannel 30 that is adjacent to and downstream of cell capture intersection region 40. Microfluidic device 10 is multi-functional in that it is effective for capturing said one or more target cell, isolating said genomic DNA from the one or more target cell, and analyzing said genomic DNA in a self-contained manner.

FIG. 2 is a schematic of one embodiment of microfluidic device 10 of the present disclosure, which embodiment can be used for capturing different biological components from a sample. As shown in FIG. 2, microfluidic device 10 can be used to capture genomic DNA 90 from three, different types of DNA sources, i.e., cancer cells, bacteria cells, and viruses, but from a single sample (e.g., a single blood sample). As shown in FIG. 2, this embodiment of microfluidic device 10 illustrates three different cell capture intersection regions 40. Each cell capture intersection region 40 is formed by the intersection of three, separate nucleic acid microchannels 30 with different portions of cell microchannel 20. In particular, as shown in FIG. 2 (moving from left to right along cell microchannel 20), there is cell capture intersection region 40 for cancer cell capture, cell capture intersection region 40 for bacteria cell capture, and cell capture intersection region 40 for virus capture.

As illustrated in FIG. 2, a blood sample enters microfluidic device 10 at an input port of cell microchannel 20 (left end in FIG. 2). The first cell capture intersection region 40 includes a cell capture array having cell capturing micropillars that are specific for certain cancer cells, so that such cancer cells are captured in the first capture intersection region 40 and then lysed, with genomic DNA 90 from the captured and lysed cancer cells being released and physically entangled and maintained by nucleic acid entanglement micropillars 80 of nucleic acid entanglement array 70 at a position within the first nucleic acid microchannel 30 that is downstream of the first cell capture intersection region 40. The second cell capture intersection region 40 (in the middle) includes a cell capture array having cell capturing micropillars that are specific for certain bacteria cells, so that such bacteria cells are captured in the second capture intersection region 40 and then lysed, with genomic DNA 90 from the captured and lysed bacteria cells being released and physically entangled and maintained by nucleic acid entanglement micropillars 80 of nucleic acid entanglement array 70 at a position within the second nucleic acid microchannel 30 that is downstream of the second cell capture intersection region 40. The third cell capture intersection region 40 (on the right) includes a cell capture array having cell capturing micropillars that are specific for certain viruses, so that such viruses are captured in the third capture intersection region 40 and then lysed, with genomic DNA 90 from the captured and lysed viruses being released and physically entangled and maintained by nucleic acid entanglement micropillars 80 of nucleic acid entanglement array 70 at a position within the third nucleic acid microchannel 30 that is downstream of the third cell capture intersection region 40.

Aspects of the microfluidic device of the present invention and various methods of use thereof are further described below. Certain terms are used that are interchangeable with the terms provided herein above and in the claims. Such interchangeable terminology is readily apparent to those of ordinary skill in the art.

In accordance with one embodiment, the present invention includes a microfluidic device capable of specifically capturing rare cancer cells and isolating their genomic DNA for on-chip amplification and subsequent genetic sequencing. The device is fabricated out of polydimethylsiloxane (PDMS) using a silicon mold. The PDMS is bonded to a glass substrate to form the microfluidic channels. The device contains two microchannels intersecting at right angles with a pillar array at the intersection functionalized with single stranded DNA aptamers that serve as specific capture ligands for cancer cells. The pillars are rotated 4° to increase the number of collisions cells undergo with the surface, thereby increasing the capture efficiency. In one of the channels downstream from the cell capture zone, there is a secondary micropillar array with smaller pillars spaced closely together that will isolate the genomic DNA from the lysed captured cells. This DNA will remain entangled in the micropillar array through multiple isothermal amplification reactions. The amplification product will be extracted from the outlet of the device, and the DNA will be sequenced to identify any genetic mutations.

As noted above, FIG. 1 is a schematic of one embodiment of the microfluidic device setup in accordance with the present invention. As shown in FIG. 1, two intersecting microchannels with an aptamer-functionalized pillar array at the intersection for specific cancer cell capture. A finer micropillar array downstream for genomic DNA isolation via physical entanglement. The initial cell sample is injected into Inlet 1, flows through the capture region, and out Outlet 1. The lysis buffer is injected into Inlet 2, and the genomic DNA is entangled in the micropillar array, while the rest of the lysate flows out of the device through Outlet 2.

Aptamers are single stranded nucleic acids that are analogous to antibodies in that they are ligands with specific binding affinity to their target, but with several advantages over antibodies. Aptamers are chemically synthesized with no batch-to-batch variability, much less expensive, more robust, and more easily functionalized. Here, a previously-selected aptamer with specific affinity to surface species present on several types of cancer cells that will capture the rare cancer cells and filter them from a complex sample can be used (see Van Simaeys D, López-Colón D, Sefah K, Sutphen R, Jimenez E, Tan W (2010) Study of the molecular recognition of aptamers selected through ovarian cancer cell-SELEX. *PLoS One* 5:e13770. doi: 10.1371/journal.pone.0013770).

To detect specific genetic mutations, these genes can be individually amplified in separate multiple displacement amplification (MDA) reactions using the same genomic DNA template isolated by the micropillars. Following each amplification, the product can be extracted from the device through the outlet. These samples can be sequenced using Sanger sequencing, which requires pure samples with a single DNA sequence, and this can be accomplished using our device capable of separate consecutive amplification reactions on the same genomic DNA. The sequencing results can be compared to the known wildtype genes, and any mutations can be identified. This information can then be passed onto clinicians to make informed recommendations for the most appropriate and effective treatment for each patient.

In various other embodiments, the present invention provides a microfluidic device for capturing selected cells and efficiently separating genomic DNA from other cellular components.

Further, although certain aspects of the present invention primarily relate to the processing and analysis of DNA extracted and immobilized in the device and treating the other cellular components, in other aspects, the present invention also relates to the use of a microfluidic device for separating the cellular components from the genomic DNA such as mitochondrial DNA or RNA.

One advantage of the microfluidic device of the present invention is that it is an integrated device, as shown herein. The integrated device of the present invention obviates the need for transferring the sample form one device to another and therefore reduces the possibilities for contamination of the sample.

The structures that are employed in the microfluidic device of the present invention for capturing the cells can be of many forms. For example, in certain embodiments, the structures can be coated with antibodies or aptamers and can include, without limitation, structures such as pillars, beads, flat surfaces, or patterned surfaces. Such methods for incorporating such features in microfluidics are known to those skilled in the art.

In accordance with the present invention, the ability to capture the DNA by mechanical entanglement with pillared structures allows the application of sequential chemical treatments and washing steps by flowing different solutions past the immobilized DNA.

The microfluidic device of the present invention can be constructed of various suitable materials. For example, in certain embodiments, the microfluidic device is constructed of transparent plastic. However, the microfluidic device of the present invention can alternatively be made of glass or other optically transparent materials to permit optical microscopic imaging of captured cells and DNA. This would permit histological evaluation of cells by a Pathologist to combine conventional imaging and analysis of cells to be combined with our molecular diagnostics.

In certain embodiments, the microfluidic device of the present invention can include multiple stages of cell capture regions of different geometry and chemical coatings to capture different cell types or other biological entities such as cancer cells, shed cells from implanted tissue, parasites, pathogens, bacteria, viruses, and others.

As described herein, FIG. 2 illustrates one non-limiting embodiment of a microfluidic device having a channel structure for capturing different biological entities for analysis.

The microfluidic device can be used to study various genes of interest, including, without limitation, genes of interest in cancer. For example, as shown in the examples section below, one such gene of interest is the TP53 gene. Additional examples of genes of interest in cancer include, without limitation, APC, BRCA1, BRCA2, CDK4, CMM1, HER2, MLH1, MSH2, p16, and Rb1. The microfluidic device of the present invention can be used to study these and other cancer genes, as well as other genes not associated with cancer.

The microfluidic device of the present invention can be constructed so that it does not require internal valves to control the flow of fluid or other materials through the channels of the device. Thus, in accordance with the present invention, there are multiple ways to control the flow through the device. For example, external valves can be used to control the flow. Alternatively, tubing clamps or fluidic "plugs" can also be used to control the direction of flow in the microfluidic device of the present invention.

The microfluidic device of the present invention can also use various types of cell capture components in addition to those specifically described herein. For example, antibodies or other recognition elements could be used in the same way as described herein with the same surface chemistry (e.g., biotinylated). Such cell capture alternatives would work and could be incorporated into the microfluidic device.

The microfluidic device of the present invention can be used to incorporate various technologies relating to microfluidic arrays, microfluidic cell capture, aptamer-based cell capture, nucleic acid elongation and capture, and the like. Such compatible technologies described in the art can be found in various published U.S. patent applications, including, without limitation, the following (which are incorporated herein by reference in their entirety): US-2015/0291952, US-2015/0204859, US-2014/0121132, US-2014/0194313, and US-2015/0011425.

EXAMPLES

The following examples are intended to illustrate particular embodiments of the present invention, but are by no means intended to limit the scope of the present invention.

Example 1

Microfluidic Device for Aptamer-Based Cancer Cell Capture and Gene Mutation Detection Genetic mutations in cancer cells are not only fundamental to the disease, but can also have tremendous impact on the efficacy of treatment. Identification of specific key mutations in a timely and cost-effective way would allow clinicians to better prescribe the most effective treatment strategy. Here, we present a novel microfluidic device as a platform for specifically capturing cancer cells and isolating their genomic DNA (gDNA) for specific amplification and sequence analysis. To capture cancer cells within the device, nucleic acid aptamers that specifically bind to cancer cells are immobilized within a microchannel containing micropillars to increase capture efficiency. The captured cells are then lysed and the gDNA is isolated via physical entanglement within a secondary micropillar array. This type of isolation allows the gDNA to be retained within the channel, and enables multiple types of analysis to be performed on the same gDNA template. The amplified gene samples undergo sequencing, and the resulting sequence information is compared against the known wildtype gene to identify any mutations. Cervical and ovarian cancer cells have been tested for mutations in the TP53, PTEN, and BRCA2 genes using this technology. This approach offers a way to monitor multiple genetic mutations in the same small population of cells, which is beneficial given the wide diversity in cancer cells, and requires very few cells to be extracted from the patient sample. With this capability for genetic monitoring, precision medicine should be more accessible for the treatment of cancer.

Experimental

Cell Culture and Buffers:

HeLa, CAOV-3, Ect1/E6E7, and End1/E6E7 cells were purchased from American Type Cell Culture (ATCC). The HeLa and CAOV-3 cells were cultured in DMEM media (Life Technologies) supplemented with non-essential amino acids, 110 mg/L sodium pyruvate, 200 mM L-glutamine (Life Technologies), 1× Pen Strep (Life Technologies), 26.8 mM HEPES, betamercaptoethanol, and containing 10% fetal bovine serum. The Ectl/E6E7 and Endl/E6E7 cells were cultured in keratinocyte-serum free media (Life Technologies) with 0.1 ng/mL human recombinant epidermal growth factor (Life Technologies), 0.05 mg/mL bovine pituitary extract (Life Technologies), and an additional 44.1 mg/L calcium chloride. Prior to use, the cells were trypsinized and resuspended in phosphate-buffered saline (PBS) binding buffer [1× Dulbecco's PBS with calcium chloride and magnesium chloride (Fisher Scientific) containing 4.5 g/L glucose, 5 mM $MgCl_2$, and 0.1% Pluronic F-68 non-ionic surfactant (Sigma Aldrich)]. HeLa cells contained GFP-conjugated histones, and CAOV-3, Ectl/E6E7, and Endl/E6E7 cells were stained with calcein-AM (Thermo Fisher Scientific) that allowed them to be observed using fluorescence microscopy.

Device Fabrication:

The devices used here were polydimethylsiloxane (PDMS) microchannels bonded to glass substrates. The devices consisted of two orthogonal microchannels that contained two micropillar arrays: a cell capture array at the intersection of the two microchannels and a gDNA isolation array downstream of the cell capture array (see FIG. 3). The PDMS channels were made via soft lithography using a silicon master mold. The master mold was fabricated from a 4" silicon wafer via standard photolithography. Microposit S1813 photoresist (Shipley) was spun onto silicon wafers and exposed to UV light using a contact mask aligner (ABM). The exposed wafer was developed using 726MIF developer (Microchemicals) and the pattern was etched 25 μm into the silicon via Bosch process using a Unaxis SLR 770 deep reactive ion etching system (Unaxis USA Inc.). A monolayer of (1H,1H,2H,2H-Perfluorooctyl)Trichlorosilane (FOTS) was deposited onto the etched silicon surface using an MVD100 molecular vapor deposition system (Applied Microstructures) to enable easy release of the PDMS from the silicon mold.

Sylgard 184 (Dow Corning) PDMS base resin was mixed in a 10:1 ratio with curing agent, and degassed in a vacuum oven at room temperature. The PDMS was poured onto the master mold and baked at 140° C. for 1 hour. The PDMS was allowed to cool to room temperature, and it was carefully peeled off of the mold. Inlet and outlet holes were created using a 1 mm biopsy punch (Sklar Instruments). To complete the formation of the channels, the patterned PDMS and a microscope slide were treated with oxygen plasma for 5 min, and then bonded together. An external 4-way L-type valve (IDEX Health and Science) was used at the DNA channel inlet and external 2-way valves were used at the cell channel inlet and both outlets to control the flow between the perpendicular channels.

Surface Chemistry:

DNA aptamers that were used to capture cancer cells were immobilized onto the surface of the microchannels via a streptavidin-biotin conjugation. The channels were initially primed and cleaned with 100% ethanol and ultrapure water. A 1×PBS solution was pumped through the channels at 50 μL/min for 9 min. A 1 mg/mL solution of streptavidin (Life Technologies) in PBS was prepared, and 120 μL were pumped through the cell channel (see FIG. 3) at 4 μL/min to immobilize streptavidin via adsorption onto the channel surface. A blocking solution containing 1% bovine serum albumin (BSA), 1% Pluronic F-68, and 1% polyvinylpyrrolidone (PVP) K15 was prepared in 1×PBS with calcium chloride and magnesium chloride, and 500 μL of this solution was pumped through both the cell and DNA channels at 4 μL/min to block the surface of the channel and prevent non-specific adhesion of cells and other reagents. Finally, biotinylated aptamers (Integrated DNA Technologies), which were previously selected (DOV4) to bind to several different types of cancer cells,[18] were diluted to 10 μM in PBS binding buffer, and 180 μL were pumped through the DNA channel at 3 μL/min. This process enabled the aptamers to be concentrated in the cell capture region at the intersection of the two channels.

Cell Capture, Lysis, and gDNA Isolation:

Cells suspended in PBS binding buffer were pumped through the cell channel (see FIG. 3) at 1 μL/min until several cells were captured, as observed via fluorescence microscopy. A solution of 6 M guanidinium isothiocyanate (VWR) was pumped at 1 μL/min through the DNA channel until cell lysis was observed. By lysing the cells in the direction of the DNA micropillar array, the gDNA becomes physically entangled and remains in the channel even under flow. To verify the gDNA was captured and retained by the micropillar array, YOYO-1 dye was used to stain the DNA in the channel by flowing the dye through the DNA channel at 1 μL/min. Otherwise, following lysis, the gDNA was washed with 1× Tris-Ethylenediaminetetraacetic acid (TE) buffer to remove any remaining cellular debris and guanidinium isothiocyanate.

Primers and Specific Gene Amplification from gDNA:

To amplify a specific gene from gDNA isothermally, MDA was used with specific primers targeting a fragment of the TP53, PTEN, or BRCA2 gene. Table 1 contains the 40 short primers used for these amplifications. Initially, the isolated gDNA was chemically denatured using Buffer DLB from the Repli-g Mini Kit (Qiagen) prepared according to the manufacturer's instructions. This solution was pumped through the DNA channel at 1 μL/min for 25 min. The gDNA was then neutralized using the Stop Solution from the Repli-g Mini Kit with the addition of 12 pmol of each MDA primer. This solution was pumped at 1 μL/min for 45 min. An MDA reaction solution was prepared from the Repli-g Mitochondrial DNA Kit according to the manufacturer's instructions, and 15-30 pmol of each MDA primer was added to the reaction solution. The microchannel device was placed on a hotplate set to 33° C., and 50 μL of MDA reaction solution was pumped through at 0.05 μL/min to perform the MDA reaction for approximately 16 hours. The eluent was collected in an Eppendorf tube. For consecutive rounds of on-chip MDA gene amplification from the same gDNA, the gDNA was denatured again, neutralized, and the MDA reaction was performed as described above, but using different primers.

For benchtop control experiments, gDNA from HeLa and CAOV-3 cells was extracted using the Blood and Cell Culture DNA Mini Kit (Qiagen). Buffer D1 and Buffer N1 from the Repli-g Mini Kit (Qiagen) were prepared, and 15 ng of extracted gDNA were denatured and neutralized according to the manufacturer's instructions. An MDA reaction master mix was prepared using the buffer and DNA polymerase from the Repli-g Mitochondrial DNA Kit (Qiagen) and various concentrations of specific MDA primers (Table 1), and this solution was added to the denatured and neutralized gDNA. This reaction was incubated at 33° C. for 16 hours.

TABLE 1

Amplification Primer Sequences
MDA Primers for the TP53, PTEN, and BRCA2 Genes

| Primer Name | Sequence | Primer Name | Sequence |
|---|---|---|---|
| TP53 MDA FOR #1 | TTG TGC CCT G (SEQ ID NO: 4) | TP53 MDA REV #1 | GCC ATG GCG C (SEQ ID NO: 5) |
| TP53 MDA FOR #2 | CAG TTG CTT T (SEQ ID NO: 6) | TP53 MDA REV #2 | GCT GTG ACT G (SEQ ID NO: 7) |
| TP53 MDA FOR #3 | GTT TCT TTG C (SEQ ID NO: 8) | TP53 MDA REV #3 | CCT CAC AAC C (SEQ ID NO: 9) |
| TP53 MDA FOR #4 | GGA GGT GCT T (SEQ ID NO: 10) | TP53 MDA REV #4 | CGC TCA TGG T (SEQ ID NO: 11) |
| TP53 MDA FOR #5 | TAG CTC GCT A (SEQ ID NO: 12) | TP53 MDA REV #5 | CAC CAT CGC T (SEQ ID NO: 13) |
| TP53 MDA FOR #6 | GTG TAG ACG C (SEQ ID NO: 14) | TP53 MDA REV #6 | TCT CTC CAG C (SEQ ID NO: 15) |
| TP53 MDA FOR #7 | CCT ATC TCA A (SEQ ID NO: 16) | TP53 MDA REV #7 | CTG GGC AAC C (SEQ ID NO: 17) |
| TP53 MDA FOR #8 | CCT GAG TGA C (SEQ ID NO: 18) | TP53 MDA REV #8 | GAA TCA GAG G (SEQ ID NO: 19) |
| TP53 MDA FOR #9 | ATC ACA CCA C (SEQ ID NO: 20) | TP53 MDA REV #9 | ACC TAA GAG C (SEQ ID NO: 21) |
| TP53 MDA FOR #10 | GGA GGC TGC A (SEQ ID NO: 22) | TP53 MDA REV #10 | AGA TGC TGA G (SEQ ID NO: 23) |
| TP53 MDA FOR #11 | ATC ACT TGA G (SEQ ID NO: 24) | TP53 MDA REV #11 | TCC ACA CGC A (SEQ ID NO: 25) |
| TP53 MDA FOR #12 | TAG GAG GCT G (SEQ ID NO: 26) | TP53 MDA REV #12 | TGT TTC TGT C (SEQ ID NO: 27) |
| TP53 MDA FOR #13 | CAC CTA TAG T (SEQ ID NO: 28) | TP53 MDA REV #13 | CAC CAC ACT A (SEQ ID NO: 29) |
| TP53 MDA FOR #14 | TAG CCA GGC A (SEQ ID NO: 30) | TP53 MDA REV #14 | TCA GGC GGC T (SEQ ID NO: 31) |
| TP53 MDA FOR #15 | ACC TCG TCT C (SEQ ID NO: 32) | TP53 MDA REV #15 | CCC CAG TTG C (SEQ ID NO: 33) |
| TP53 MDA FOR #16 | AGC CTG GGT A (SEQ ID NO: 34) | TP53 MDA REV #16 | TTA ACC CCT C (SEQ ID NO: 35) |
| TP53 MDA FOR #17 | GAG CCC AGG A (SEQ ID NO: 36) | TP53 MDA REV #17 | AGG GCC ACT G (SEQ ID NO: 37) |
| TP53 MDA FOR #18 | CCA AGG CAG G (SEQ ID NO: 38) | TP53 MDA REV #18 | CCC CCC TAC T (SEQ ID NO: 39) |
| TP53 MDA FOR #19 | TCC CAG CAC T (SEQ ID NO: 40) | TP53 MDA REV #19 | TAG GGA GGT C (SEQ ID NO: 41) |
| TP53 MDA FOR #20 | TTG GTG GCT C (SEQ ID NO: 42) | TP53 MDA REV #20 | TTG CAC ATC T (SEQ ID NO: 43) |
| PTEN MDA FOR #1 | GTC CAG AGC C (SEQ ID NO: 44) | PTEN MDA REV #1 | GCA GCC GCA G (SEQ ID NO: 45) |
| PTEN MDA FOR #2 | AGC CGC CGC A (SEQ ID NO: 46) | PTEN MDA REV #2 | GAA CGT GGG A (SEQ ID NO: 47) |
| PTEN MDA FOR #3 | AGT CGC TGC A (SEQ ID NO: 48) | PTEN MDA REV #3 | TTC GCA TCC G (SEQ ID NO: 49) |
| PTEN MDA FOR #4 | TGC TGA GGA G (SEQ ID NO: 50) | PTEN MDA REV #4 | CTG ACC AGG G (SEQ ID NO: 51) |
| PTEN MDA FOR #5 | GCC GCT GCC A (SEQ ID NO: 52) | PTEN MDA REV #5 | CAC ACC CTA G (SEQ ID NO: 53) |

TABLE 1-continued

Amplification Primer Sequences
MDA Primers for the TP53, PTEN, and BRCA2 Genes

| Primer Name | Sequence | Primer Name | Sequence |
|---|---|---|---|
| PTEN MDA FOR #6 | CTT CTC CCC A (SEQ ID NO: 54) | PTEN MDA REV #6 | GCA ACC AGG C (SEQ ID NO: 55) |
| PTEN MDA FOR #7 | CCG TTC GGA G (SEQ ID NO: 56) | PTEN MDA REV #7 | CAA TCG GTG G (SEQ ID NO: 57) |
| PTEN MDA FOR #8 | GAG GCC GCC G (SEQ ID NO: 58) | PTEN MDA REV #8 | GGA AGA GAC C (SEQ ID NO: 59) |
| PTEN MDA FOR #9 | CCC CCG TGG C (SEQ ID NO: 60) | PTEN MDA REV #9 | CCG AGC TCG C (SEQ ID NO: 61) |
| PTEN MDA FOR #10 | CCC GTC CGC C (SEQ ID NO: 62) | PTEN MDA REV #10 | GCT CAA CCT C (SEQ ID NO: 63) |
| PTEN MDA FOR #11 | CCC GGG CCG G (SEQ ID NO: 64) | PTEN MDA REV #11 | GGG CCT AAG C (SEQ ID NO: 65) |
| PTEN MDA FOR #12 | GGC GGC GGC A (SEQ ID NO: 66) | PTEN MDA REV #12 | CGT GCA ACA C (SEQ ID NO: 67) |
| PTEN MDA FOR #13 | GCC TCC AAC A (SEQ ID NO: 68) | PTEN MDA REV #13 | GCA ACT CAG G (SEQ ID NO: 69) |
| PTEN MDA FOR #14 | CGC CGG AGA G (SEQ ID NO: 70) | PTEN MDA REV #14 | GCC CTC AAT G (SEQ ID NO: 71) |
| PTEN MDA FOR #15 | GTC GCC TGT C (SEQ ID NO: 72) | PTEN MDA REV #15 | CCC CAT AGG G (SEQ ID NO: 73) |
| PTEN MDA FOR #16 | GCT CCA GGG A (SEQ ID NO: 74) | PTEN MDA REV #16 | CTG GGA TCA G (SEQ ID NO: 75) |
| PTEN MDA FOR #17 | CGG CGG CCG C (SEQ ID NO:76) | PTEN MDA REV #17 | CTG GCA TCA C (SEQ ID NO: 77) |
| PTEN MDA FOR #18 | GGG AGA AGC G (SEQ ID NO: 78) | PTEN MDA REV #18 | CGG TGA GCA G (SEQ ID NO: 79) |
| PTEN MDA FOR #19 | CAC CTC CCG C (SEQ ID NO: 80) | PTEN MDA REV #19 | TCA GAG GAC C (SEQ ID NO: 81) |
| PTEN MDA FOR #20 | AGG CGC GGC G (SEQ ID NO: 82) | PTEN MDA REV #20 | CCC CTC TTG C (SEQ ID NO: 83) |
| BRCA2 MDA FOR #1 | CCT CAG TCA C (SEQ ID NO: 84) | BRCA2 MDA REV #1 | GAC GTA CTG G (SEQ ID NO: 85) |
| BRCA2 MDA FOR #2 | TCC AGC GCT T (SEQ ID NO: 86) | BRCA2 MDA REV #2 | CCA CTA GAC G (SEQ ID NO: 87) |
| BRCA2 MDA FOR #3 | GAT GGG ACT G (SEQ ID NO: 88) | BRCA2 MDA REV #3 | AGG GGC CAG T (SEQ ID NO: 89) |
| BRCA2 MDA FOR #4 | CCC ATC CTC A (SEQ ID NO: 90) | BRCA2 MDA REV #4 | GGG GGT CCT A (SEQ ID NO: 91) |
| BRCA2 MDA FOR #5 | TGG ACA GCA C (SEQ ID NO: 92) | BRCA2 MDA REV #5 | CAC CAC GCC C (SEQ ID NO: 93) |
| BRCA2 MDA FOR #6 | GGC TAG TGG C (SEQ ID NO: 94) | BRCA2 MDA REV #6 | AAG TGC TGG G (SEQ ID NO: 95) |
| BRCA2 MDA FOR #7 | ACT AGC CAC G (SEQ ID NO: 96) | BRCA2 MDA REV #7 | TCC GCC CAC C (SEQ ID NO: 97) |
| BRCA2 MDA FOR #8 | CTG GTT AGC G (SEQ ID NO: 98) | BRCA2 MDA REV #8 | ACT TCT GGC C (SEQ ID NO: 99) |
| BRCA2 MDA FOR #9 | CTC TGT CCC C (SEQ ID NO: 100) | BRCA2 MDA REV #9 | GTT GGC CAG G (SEQ ID NO: 101) |
| BRCA2 MDA FOR #10 | GCG GCG TTG G (SEQ ID NO: 102) | BRCA2 MDA REV #10 | CAC GCA GCA C (SEQ ID NO: 103) |

TABLE 1-continued

Amplification Primer Sequences
MDA Primers for the TP53, PTEN, and BRCA2 Genes

| Primer Name | Sequence | Primer Name | Sequence |
|---|---|---|---|
| BRCA2 MDA FOR #11 | TGC TGA TGG G (SEQ ID NO: 104) | BRCA2 MDA REV #11 | GTA GCT GGG A (SEQ ID NO: 105) |
| BRCA2 MDA FOR #12 | AAG CCC CTG G (SEQ ID NO: 106) | BRCA2 MDA REV #12 | CTC CTG CCT C (SEQ ID NO: 107) |
| BRCA2 MDA FOR #13 | GGG CAC GCT G (SEQ ID NO: 108) | BRCA2 MDA REV #13 | CCT CCA GGG T (SEQ ID NO: 109) |
| BRCA2 MDA FOR #14 | AGA TGA CGC C (SEQ ID NO: 110) | BRCA2 MDA REV #14 | CTT GGC TCA C (SEQ ID NO: 111) |
| BRCA2 MDA FOR #15 | CTT CCC TCC C (SEQ ID NO: 112) | BRCA2 MDA REV #15 | TGG CCC AGG C (SEQ ID NO: 113) |
| BRCA2 MDA FOR #16 | CCT TCA GCT C (SEQ ID NO: 114) | BRCA2 MDA REV #16 | CAA CGT GAG G (SEQ ID NO: 115) |
| BRCA2 MDA FOR #17 | GGC CCG GCC T (SEQ ID NO: 116) | BRCA2 MDA REV #17 | GCG ACA TGG G (SEQ ID NO: 117) |
| BRCA2 MDA FOR #18 | CTG GGT CTC C (SEQ ID NO: 118) | BRCA2 MDA REV #18 | TCC ATG GTG G (SEQ ID NO: 119) |
| BRCA2 MDA FOR #19 | CGA GCC CCG C (SEQ ID NO: 120) | BRCA2 MDA REV #19 | CCA GTG GCT C (SEQ ID NO: 121) |
| BRCA2 MDA FOR #20 | GCC CGA AGG C (SEQ ID NO: 122) | BRCA2 MDA REV #20 | TGC TGC AAG G (SEQ ID NO: 123) |

PCR Primers

| Primer Name | Sequence |
|---|---|
| TP53 PCR FOR | ACT TTC AAC TCT GTC TCC TTC CTC TTC CTA (SEQ ID NO: 124) |
| TP53 PCR REV | GGA CGC GGG TGC CG (SEQ ID NO: 125) |
| PTEN PCR FOR | AAG CGG CGG CAG AGC G (SEQ ID NO: 126) |
| PTEN PCR REV | TCT GGG AGC CTG TGG CTG AAG (SEQ ID NO: 127) |
| BRCA2 PCR FOR | ATG CAT CCC TGT GTA AGT GCA TTT TGG (SEQ ID NO: 128) |
| BRCA2 PCR REV | GCG TGT CTT AAA AAT TTC AAA AAA TGT TGG CCT CT (SEQ ID NO: 129) |

Gene Sequencing:

The MDA product was verified by running the product on a 1% agarose gel, and staining the gel with SYBR Gold (Thermo Fisher Scientific). Since the product was around 10 kilobases (kb), a smaller product must be made to enable sequencing. Thus, a PCR amplification was performed using 10-60% of the MDA product. The PCR product was verified and purified using 8-10% polyacrylamide gel electrophoresis (PAGE) stained with ethidium bromide or SYBR Gold. To purify the PCR product for sequencing, the 130-nt band was cut from the gel, crushed, suspended in 3 M NaAc pH 6.2, and incubated at 37° C. with mixing overnight. The gel pieces were removed from the sample, the sample underwent phenol-chloroform extraction and ethanol precipitation, and the DNA was resuspended in DEPC water. This purified PCR product was sequenced via Sanger Sequencing, and the sequence was compared to the known wildtype gene.

Results and Discussion

Microchannel Design:

The assay presented here involves two main steps, cancer cell capture using aptamers and genomic DNA analysis. The ability to perform these two step easily all within one device would significantly reduce contamination and sample loss, which is important when developing an assay for rare cells. Therefore, the device was designed to have two intersecting orthogonal microchannels: the cell channel where cancer cells are captured, and the DNA channel where the gDNA from the captured cells is isolated (FIG. 3). The cell channel was 1 mm wide, and the DNA channel was 250 μm, 500 μm, or 1 mm wide. The depth of the channels was ~25 μm. The device also contained two micropillar arrays, one for cancer cell capture and one for gDNA isolation. The cell capture array was located at the intersection of the two microchannels, and consisted of pillars 50 μm in diameter. This array was rotated by 4° to maximize the contact between the cells and the channel surface containing the aptamers, thereby improving the capture efficiency.[19] The DNA micropillar array was very similar to our previously-developed microarray for gDNA isolation.[17] The array presented here consisted of 4×4 μm pillars spaced in a gradient that started with the pillars 10 μm apart and finished with them 7 μm apart. These small pillars placed in such a fine array caused the gDNA to become physically entangled and remain within the array even under flow, while allowing the cellular debris to flow out of the device. This is highly advantageous and enables multiple types of analysis to be performed on the same gDNA template.

To control the flow within the device, valves were needed at the inlets and outlets. An external 4-way L-type valve was used at the DNA channel inlet to not only control flow, but also eliminate most of the dead volume caused by the length of tubing needed to reach the syringe pump while the device is either observed under a microscope or is incubated using a hotplate. This is necessary because high initial flowrates cannot be used after the gDNA is isolated on the micropillar array, as there is a risk of losing some of the entangled gDNA under the high flow conditions. External 2-way shutoff valves were used at each of the outlets as well as the cell channel inlet to control the fluid flow. These types of valves were used because they do not disturb the fluid within the channels, whereas controlling the flow using tubing clamps causes significant flow during the clamping process, which can disturb the captured cells. This device design and setup enables this assay to be performed easily by the user.

Figure 4A:
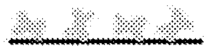
FIGS. 4A-4F: Cancer cell capture in microfluidic channels using aptamers. An illustration of the surface chemistry within the microchannels is shown on the left. All of the images shown are fluorescent images of the cell capture region.
Figure 4A:
Figure 4B:
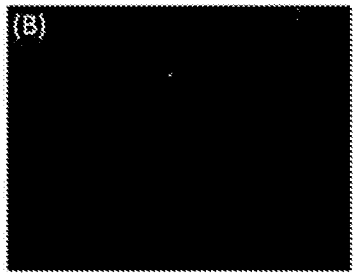
Figure 4C:
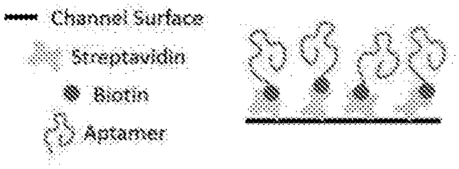
Figure 4C:
Figure 4D:
Figure 4E:
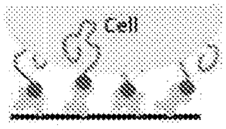
Figure 4E:
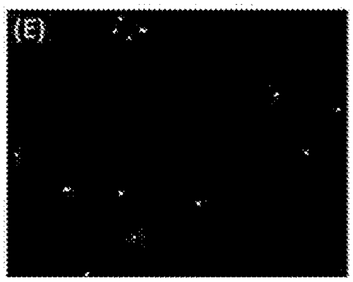
Figure 4F:
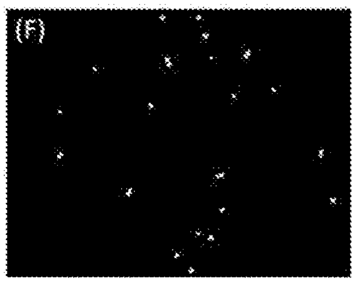
Figure 5A:
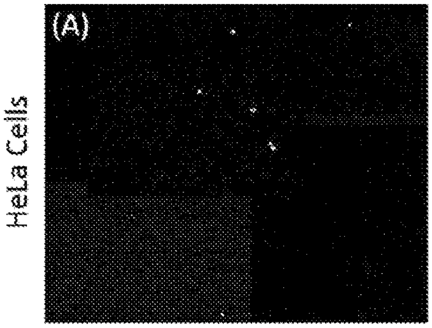
FIGS. 5A-5D: Cancer cell lysis and isolation of gDNA via physical entanglement within the micropillar array.
Figure 5B:
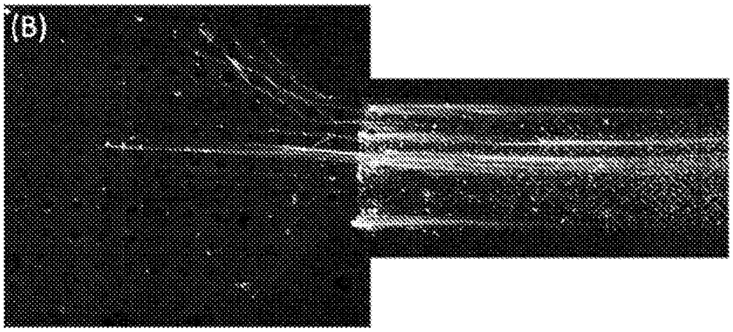
Figure 5C:
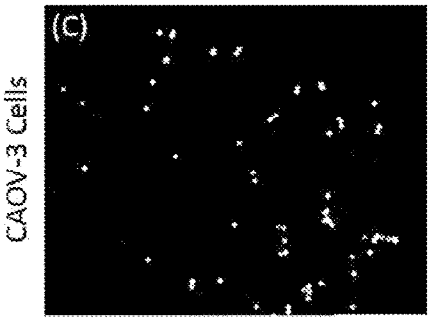
Figure 5D:
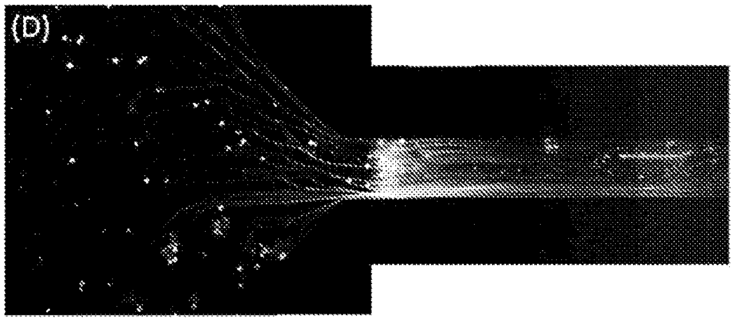

HeLa and CAOV-3 Cell Capture and Genomic DNA Isolation:

The target cells were suspended in PBS binding buffer and pumped through the device with aptamers immobilized on the surface of the cell capture region containing a pillar array. The cell capture was most efficient at a flowrate of 5 μL/min when the cells were freshly trypsinized and the channel depth was ~25 μm. Several flowrates were tested ranging from 20 μL/min down to 0.1 μL/min. At high flowrates (>10 μL/min), the linear velocity of the cells was very high and the cells did not bind to the aptamers on the surface easily. At low flowrates (<5 μL/min), the cells did bind to the aptamers, but the throughput was very low and there was increased non-specific adhesion of the cells to the device. Cells used from frozen stocks did not bind as readily, likely due to different surface compositions caused by the shock of a freeze/thaw cycle. With channels deeper than 25 μm, the cell capture took longer, since fewer collisions with the channel surface were likely occurring. To demonstrate using aptamers to specifically capture cancer cells within the microchannels, HeLa and CAOV-3 cancer cells were tested with and without aptamers immobilized on the surface, and Ect1/E6E7 and End1/E6E7 non-cancerous cells were tested with aptamers immobilized on the surface. FIG. 4A and FIG. 4B show the cell capture region without aptamers, and indicate that HeLa and CAOV-3 cells do not non-specifically adhere to the surface of the device. FIG. 4C and FIG. 4D show the cell capture region with aptamers immobilized, and demonstrate that Ect1/E6E7 and End1/E6E7 non-cancerous cells neither bind non-specifically to the device, nor bind to the aptamers. FIG. 4E and FIG. 4F show that HeLa and CAOV-3 cancer cells bind to aptamers immobilized within the cell capture region of the device. These results demonstrate the successful use of aptamers to specifically capture cancer cells.

After successfully capturing cancer cells within the cell capture region, the cells were lysed through the DNA channel. The cell contents flowed through the DNA micropillar array, and the gDNA was isolated on the pillars via physical entanglement. To verify that the gDNA was isolated and retained within the micropillar array, the gDNA was stained with YOYO-1 dye, and the results are shown in FIG. 5 for both HeLa and CAOV-3 cells. The gDNA from both types of cells was successfully isolated by the micropillar array and remained within the microchannel after multiple hours of flow. This gDNA isolation technique has several advantages, including allowing the gDNA to be completely chemically available for any downstream reaction, and more importantly it enables the gDNA to be retained within the device even under flow. This enables multiple types of analyses to be performed on the same template gDNA, so a large amount of information can be gathered from a single small population of cells without necessitating substantial whole genome amplification, which can be biased and information can be lost.[20-22]

Figure 6A:
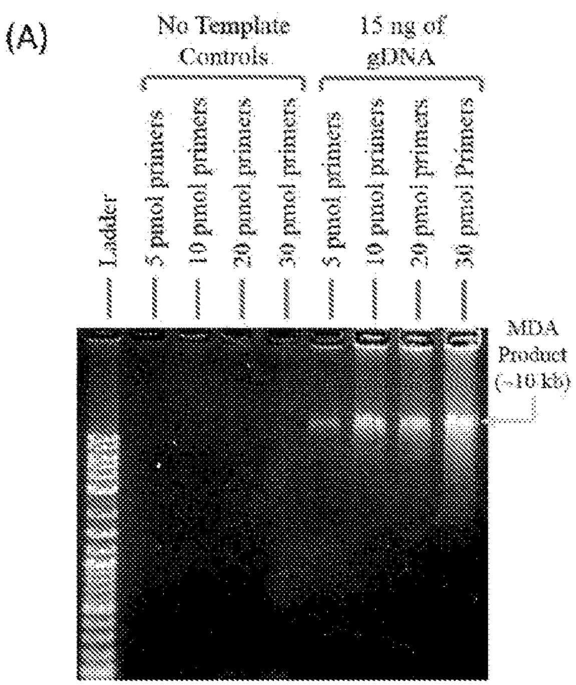
FIGS. 6A-6D: Gel images of benchtop and on-chip demonstration of specific MDA of the TP53 gene and smaller gene fragments from PCR.
Figure 6B:
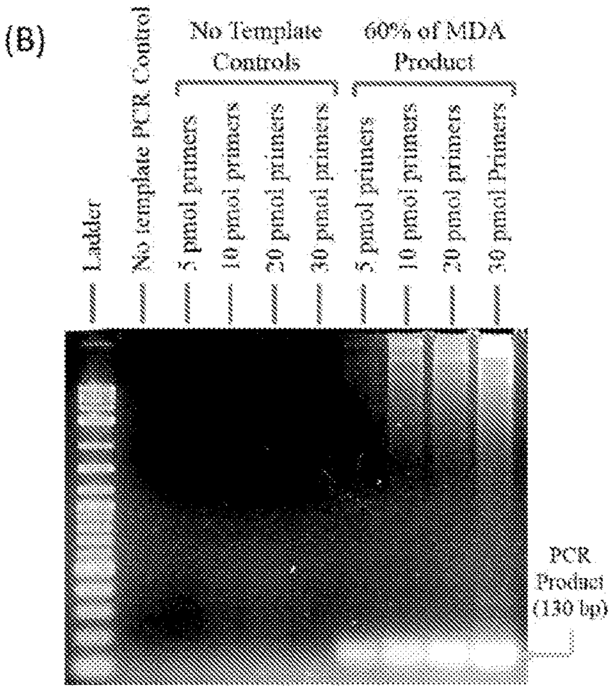
Figure 8:
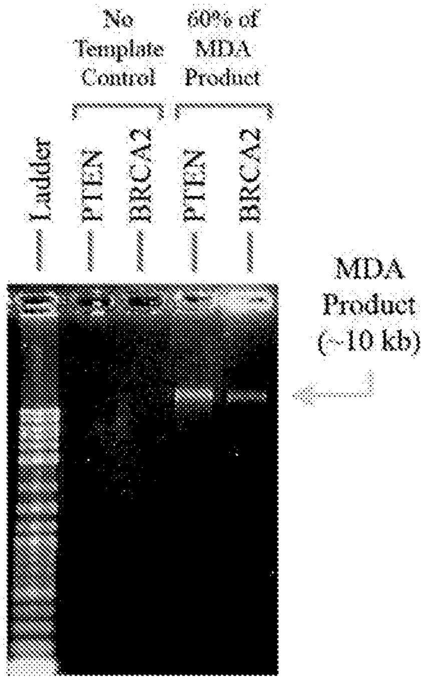
FIG. 8: Benchtop MDA results for PTEN and BRCA2 genes. MDA reactions were performed using the primers for PTEN and BRCA2, and controls containing no gDNA and reactions containing 15 ng of gDNA extracted from CAOV-3 cells were performed. The reaction products were analyzed on a 1% agarose gel. The yellow arrow indicates the 10-kb MDA product band on the gel.
Figure 9:
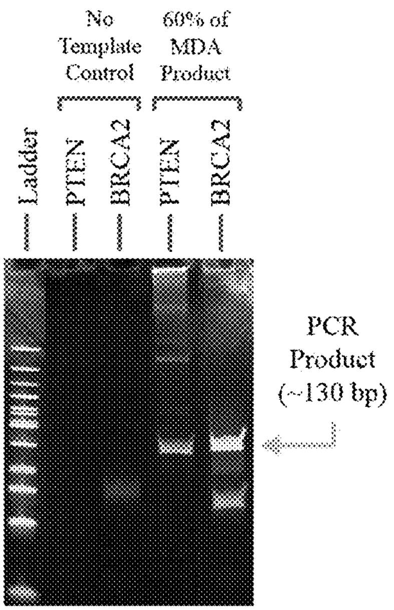
FIG. 9: Benchtop PCR results for PTEN and BRCA2 genes. PCR reactions were performed using the primers for PTEN and BRCA2, and controls containing no MDA product and reactions containing 60% of the MDA product were performed. The reaction products were analyzed on a 10% polyacrylamide gel. The yellow arrow indicates the 130-nt PCR product band on the gel.
Figure 10:
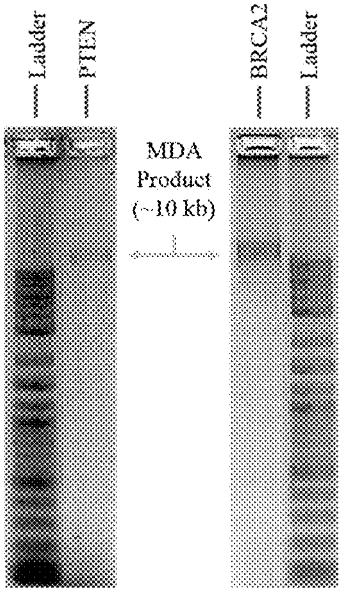
FIG. 10: On-chip MDA results for PTEN and BRCA2 genes. MDA reactions were performed within channels containing isolated CAOV-3 gDNA using either PTEN or BRCA2 MDA primers. The MDA product was analyzed on a 1% agarose gel. The yellow arrows indicate the ~10-kb MDA product.
Figure 11:
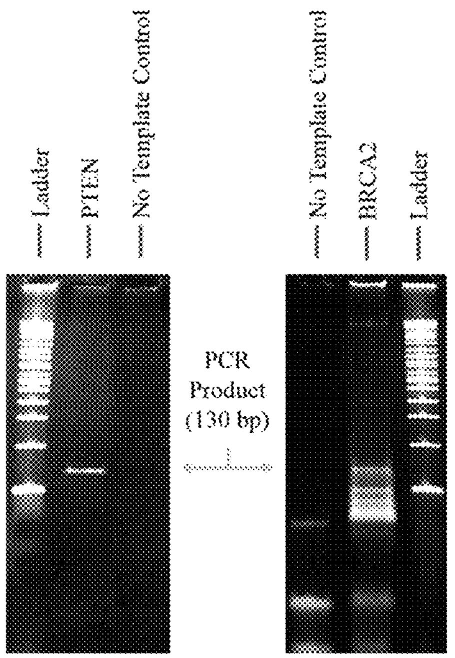
FIG. 11: Product from PCR reaction using 60% of the MDA product amplifying the PTEN and BRCA2 genes on-chip from CAOV-3 cells. PCR reactions were performed using the primers for PTEN and BRCA2, and controls containing no MDA product and reactions containing 60% of the MDA product were performed. The PCR products were analyzed on a 10% PAGE gel. The yellow arrows indicate the 130-bp PCR product.
Figure 12:
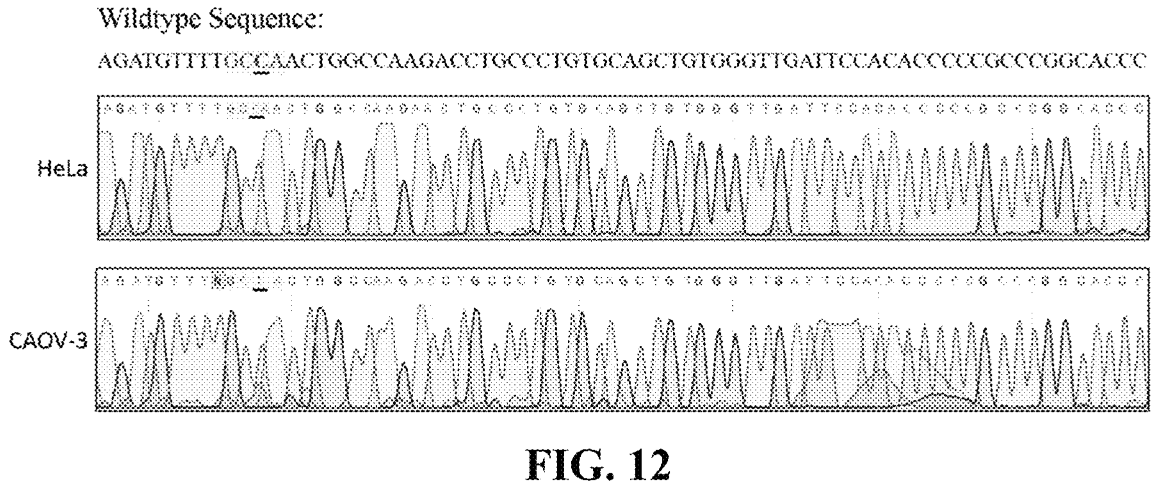
FIG. 12 shows the wildtype sequence (SEQ ID NO:1) and the sequencing results for the TP53 fragments from HeLa (SEQ ID NO:2) and CAOV-3 (SEQ ID NO:3) cells.

Specific Isothermal Amplification of Genes from gDNA:

With the gDNA isolated and retained within the micropillar array, several types of genetic analyses can be performed. Here, we demonstrated the amplification of specific genes to determine their nucleotide sequence and discover any genetic mutations. MDA, an isothermal amplification technique, was used to reduce the complexity and cost of the device and enable straightforward device operation, since thermocycling is not necessary. MDA uses many short primers and a strand-displacing DNA polymerase (φ29) to make numerous copies of the template DNA isothermally. Whereas MDA is commonly used as a method for whole genome amplification,[23-26] in this work we use MDA to amplify a specific gene from gDNA. To our knowledge, this is the first demonstration of using MDA to amplify a specific gene from gDNA. Forty 10-nt primers (20 forward and 20 reverse primers) were designed around regions of the TP53, PTEN, and BRCA2 genes, which are commonly mutated genes in cervical and ovarian cancer.[27,30] This modified MDA technique for amplifying these genes from gDNA was initially verified in benchtop experiments using purified HeLa and CAOV-3 gDNA. FIG. 6A shows the successful amplification of TP53 from purified HeLa gDNA. FIG. 8 shows the successful amplification of PTEN and BRCA2 from purified CAOV-3 gDNA. Shorter gene fragments were also produced via PCR from these MDA products (FIG. 6B and FIG. 9).

Figure 6C:
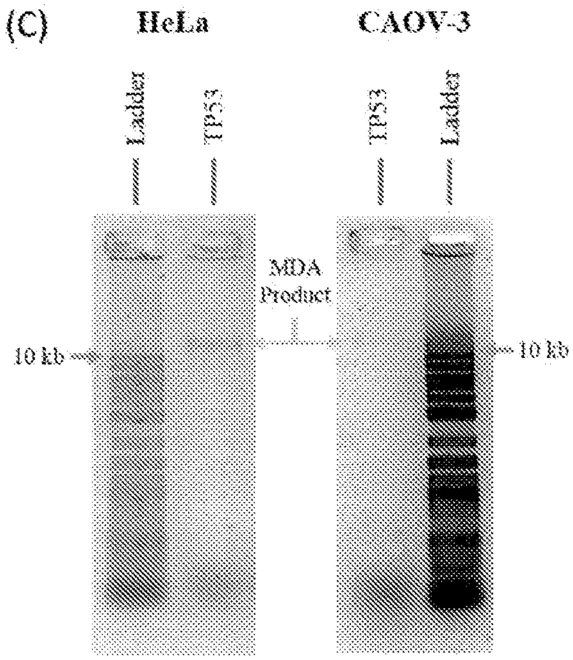
Figure 6D:
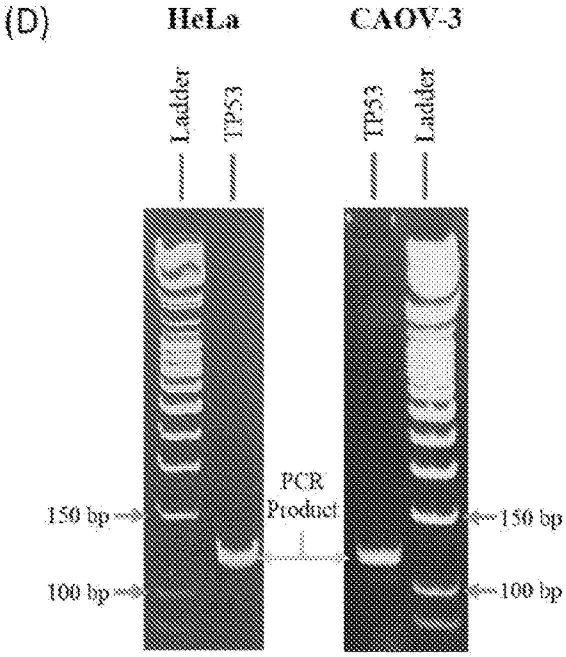

The isolated gDNA from HeLa and CAOV-3 cells was first chemically denatured to create single stranded DNA (ssDNA). The DNA was then neutralized prior to the MDA reaction. Since the gDNA is entangled in the micropillar array, upon denaturation the two complimentary strands likely cannot diffuse and migrate away from each other as readily as they can in a bulk solution, so it is possible that some may rehybridize upon neutralization. This would prevent the MDA reaction from occurring efficiently. To reduce the likelihood of this occurring, the neutralization buffer was spiked with the MDA primers allowing the primers to bind to the ssDNA before it rehybridizes. The MDA reaction solution containing additional primers and the DNA polymerase was pumped through the device and the amplification product was collected. The MDA product from HeLa and CAOV-3 cell gDNA was analyzed on an agarose gel, and FIG. 6C shows images of the gels after a successful MDA reaction. The MDA product DNA strands were around 10 kb in length, and this is because the φ29 polymerase is known to extend for approximately 10 kb.[28,29] To prepare the amplified gene sample for sequencing, it must be shortened to accommodate the sequencing technology. For Sanger sequencing, up to a few hundred bases can be sequenced. To create a shorter gene fragment from the HeLa and CAOV-3 MDA product, PCR was used to create 130-nt DNA strands, which were verified via PAGE (FIG. 6D). MDA is an advantageous technique to use not only because it is isothermal, but also because amplifying 10 kb strands allows large strands of gDNA to be amplified from cells. These strands can be completely sequenced inexpensively by performing a few PCRs to isolate different regions of the strand, and performing Sanger sequencing on these pure samples. Alternatively, the MDA product can be digested into shorter fragments and targeted next-generation sequencing can be performed.

Figure 7A:
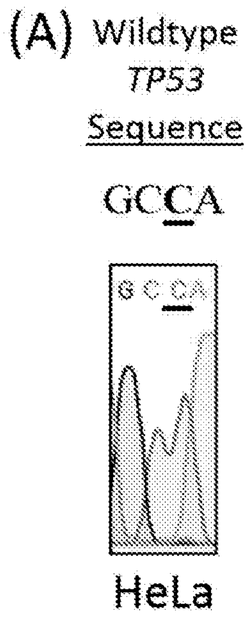
FIGS. 7A-7B: Sanger sequencing results from HeLa and CAOV-3 cell TP53 gene fragments where a SNP is known to occur in CAOV-3 cells.
Figure 7B:
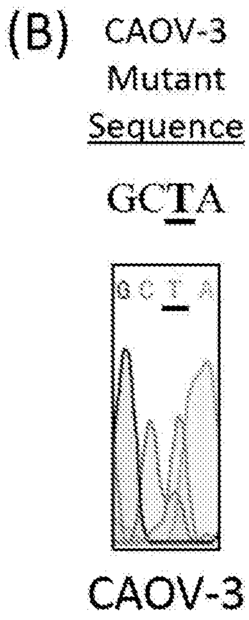

Sequencing of the TP53 Gene Fragment:

The purified TP53 gene fragments from HeLa and CAOV-3 cells were sequenced via Sanger sequencing. This sequencing technique was chosen because it is fast, inexpensive, and can perform longer reads than other techniques. It also requires the sample to be pure, as only one read is performed. The wildtype sequence for TP53 was obtained from the International Agency for Research on Cancer, and the known mutation in the TP53 gene in CAOV-3 cells was obtained from the mutation data for this cell line from ATCC. CAOV-3 cells contain a homozygous single-nucleotide polymorphism (SNP), and this SNP (c.406C>T) is a nonsense mutation resulting in a truncated p53 protein. FIG. 7 shows the wildtype and mutated nucleotide sequence and the sequencing results from HeLa (FIG. 7A) and CAOV-3 (FIG. 7B) cells for the region where the SNP occurred. These results show that we were able to successfully detect a point mutation in the CAOV-3 TP53 gene, while HeLa cells contained the wildtype sequence of this gene fragment. Analogous testing of all locations on this gene would allow us to determine additional genetic information about this gene in these two cancer cell lines. Additional genes that commonly contain mutations in cancer could also be tested in this way, since the gDNA is retained on the micropillars and is available for additional amplification reactions and analysis.

CONCLUSIONS

We have developed a device and technique for capturing cancer cells using aptamers, and isolating their gDNA for genetic analysis. The device was designed to enable both the cell capture and gDNA isolation to occur within a single device to significantly reduce contamination and sample loss. Preventing sample loss is particularly important, since most cells of interest, such as circulating tumor cells, are rare and are generally found in low numbers. The device was also designed to isolate the gDNA via physical entanglement within a micropillar array. This isolation technique allows the gDNA to be chemically available for downstream reactions. It also enables the gDNA to be retained within the microchannel even under flow, which enables multiple types of analyses to be performed on the same template gDNA.

We demonstrated on-chip isothermal amplification of a specific gene and subsequent sequencing of this gene to determine any genetic mutations. We successfully detected a point mutation in the TP53 gene in CAOV-3 cells. Specifically, we developed a method using MDA to amplify a specific gene from whole gDNA. This technique allows for long strands of DNA to be produced that can cover an entire large gene up to 10 kb. Here, we used PCR to produce pure samples of smaller gene fragments that could be sequenced using Sanger sequencing, but other sequencing methods can be used where pure samples are not necessary as multiple reads are taken.

An assay like this can be extremely impactful when it comes to cancer diagnosis and treatment. If the mutations present in a specific patient's cancer cells can be identified, clinicians will be able to use this information to better diagnose the patient and better determine the most effective treatment options. This would truly enable precision medicine when it comes to cancer treatment, which is necessary to effectively treat patients considering the substantial diversity observed in cancer.

While we have described the application of our device primarily in terms of isolating and genetically analyzing cancer cells. The same device and approach can be applied to other improvements in bioanalytical applications. For example, the rapid identification of antibiotic resistant bacteria is of great importance for determining appropriate treatment in a timely manner. Our device could be employed to select by aptamer binding a particular type of bacteria from body fluid or a swab sample and with even a single or a few cells rapid genetic analysis could determine the strain of the bacteria and its antibiotic resistance. This would be much more rapid than culturing cells to determine the effective antibiotic treatment. Another example would be for forensic analysis where human cells could be isolated from a complex sample and even a few cells genetically analyzed to identify the genetic fingerprint of the individual from whom the cells originate. There are numerous other examples to which our device and approach could be applied such as environmental monitoring for invasive organisms, analyzing drinking water safety or detecting rejections of human medical transplants where the rapid isolation of selected cell types and identification of specific genetic traits would be valuable.

Supplementary information is shown in FIGS. 8-12, with the descriptions being provided herein above in the Brief Description of the Drawings section.

Example 2

Various Embodiments of a Microfluidic Device for Aptamer-Based Cancer Cell Capture and Gene Mutation Detection The microfluidic device of the present invention can be used for aptamer-based cell capture for various uses. This example illustrates one protocol for preparing one embodiment of a microfluidic device of the present invention. As shown, this example describes a protocol of the preparation process, starting with the PDMS device fabrication and continuing through to the on-chip specific multiple displacement amplification (MDA) reaction.

Surface Chemistry for HeLa Cell Capture in Microfluidic Devices

A. Fabrication of PDMS Devices

- For each wafer, mix 50 g of PDMS base and 5 g of curing agent thoroughly
- Degass the mixture completely in the vacuum oven
- Make an Al foil boat around the wafer and pour the PDMS onto the wafer
- Pop any bubbles that formed during the pouring process
- Put the samples in the oven at cure at 140 C for >1 h Bonding the Devices:

Once cured, SLOWLY and carefully peel the PDMS off of the wafer to prevent the pillars from ripping off Cut out the devices individually to fit on a microscope slide and punch inlet and outlet holes using a 1-mm biopsy punch Wash the PDMS thoroughly with soap and tap water and then DI water Rinse the PDMS and a microscope slide thoroughly with 100% ethanol and DI water Dry the PDMS and slide with nitrogen and place immediately into the plasma cleaner Draw a vacuum on the plasma cleaner for about a minute and then turn the plasma on high Adjust the door valve so that the plasma is a pink color (a blueish plasma means there is not enough oxygen)

Plasma treat for 10 min

Immediately take out the PDMS and slide and bond them, but do not push too hard as the channels can collapse Cover the inlet and outlet holes with tape to prevent debris from entering the device B. Cleaning the Device To avoid having to clean with acid and base, use a device that has been bonded within 48 hours.

With a device bonded within the last 48 hours,

Connect tubing to all inlets and outlets, and connect valves to all inlets and outlets The valves at the inlets should have a third connection that allows dead volume to be pumped out into waste Fill 2 1-mL syringes for each device with ethanol and connect them to both inlet valves With the valves set to flow out to waste, pump 100 μL of ethanol through at 100 μL/min to flush out any bubbles Set the valves to flow into the device and then flow 900 μL through both inlets at 30 μL/min Fill a 1-mL syringe with ultrapure water With the valves set to flow out to waste, pump 100 μL of water through the cell channel inlet valve at 100 μL/min to flush out any bubbles Set the valve to flow into the device and then flow 1 mL of water through the cell channel at 50 μL/min Repeat this for the DNA channel Fill a 1-mL syringe with filter-sterilized 1×PBS With the valves set to flow out to waste, pump 100 μL of PBS through the cell channel inlet valve at 100 μL/min to flush out any bubbles Set the valve to flow into the device and then flow 450 μL of water through the cell channel at 50 μL/min Repeat this for the DNA channel C. Surface Chemistry for Immobilizing Aptamers Fill a 1-mL syringe with ~200 μL of 1 mg/mL streptavidin With the valves set to flow out to waste, pump ~60 μL of streptavidin through the cell channel inlet valve at 80 μL/min to flush out any bubbles (stop flowing once bubbles are flushed out and the fluid stream can be seen in the waste tubing past the valve)

Set the valve to flow into the device and then flow 90 μL of streptavidin through the cell channel inlet at 3 μL/min, and then incubate for 10-15 mins Fill a 1-mL syringe with a blocking solution of 1% BSA, 1% Pluronic F-68, and 1% polyvinylpyrrolidone (PVP) K15 in PBS binding buffer (1×DPBS with Mg and Ca, 4.5 g/L glucose, and 5 mM $MgCl_2$)

With the valves set to flow out to waste, pump 80 μL of blocking solution through the cell channel inlet valve at 80 μL/min to flush out any bubbles Set the valve to flow into the device and then flow 500 μL of blocking solution through the cell channel inlet at 4 μL/min Repeat for the DNA channel Prepare an aptamer solution by combining 3 μL of 1 mM biotinylated DOV4 aptamer with 297 μL of PBS binding buffer Incubate this aptamer solution at 75° C. for 5 mins then allow to cool to RT Fill a 1-mL syringe with this solution With the valves set to flow out to waste, pump ~60 μL of aptamer solution through the DNA channel inlet valve at 80 μL/min to flush out any bubbles (stop flowing once bubbles are flushed out and the fluid stream can be seen in the waste tubing past the valve)

Set the valve to flow into the device and then flow 180 μL of aptamer solution through the DNA channel inlet at 3 μL/min D. Preparing the HeLa Cells From Culture:

Passage the cells as usual, but resuspend one pellet with 3 mL PBS binding buffer containing no DMSO This can be used directly From Frozen:

Thaw quickly an aliquot of cells in a 37° C. waterbath and transfer the cells to a falcon tube. Add 9 mL of PBS binding buffer and spin down the solution at 100×g for 5 mins Take out supernatant and resuspend in 3 mL of PBS binding buffer Repeat this washing 3 times to remove all of the DMSO Resuspend the cells in 1 mL of PBS binding buffer and use directly in the device E. Capturing and Lysing HeLa Cells Fill a 1-mL syringe with HeLa cell suspension With the valves set to flow out to waste, pump 80 μL of cell suspension through the cell channel inlet valve at 10 μL/min to flush out any bubbles Set the valve to flow into the device and then flow cells at 1 μL/min and monitor capture using a fluorescence microscope (the HeLa cells have green fluorescent protein on their histones that enables them to fluoresce)

Once cells are captured, close the cell channel valves

Fill a 1-mL syringe with ~2004 of 6M guanidinium thiocyanate in ultrapure water (this is the lysis solution)

With the valves set to flow out to waste, pump 80 μL of the solution through the DNA channel inlet valve at 80 μL/min to flush out any bubbles Set the valve to flow into the device and then flow solution at 1 μL/min and monitor lysis using a fluorescence microscope (look for disappearance of fluorescent whole cells)

F. Performing Specific MDA Reaction

Flush out the lysis solution with 1× TE: Fill a 1-mL syringe with ~200 μL of 1× TE With the valves set to flow out to waste, pump 80 μL of the solution through the DNA channel inlet valve at 80 μL/min to flush out any bubbles Set the valve to flow into the device and then flow 60 μL of solution at 1 μL/min Use the REPLI-g Mitochondrial DNA kit to provide the buffer and enzymes for the MDA reaction Prepare the D1 denaturing buffer:

54 μL Reconstituted Buffer DLB

192 μL ultrapure Water

Fill a 1-mL syringe with D1 solution

With the valves set to flow out to waste, pump 80 μL of the solution through the DNA channel inlet valve at 80 μL/min to flush out any bubbles Set the valve to flow into the device and then flow 25 μL of solution at 1 μL/min Prepare the N1 Neutralizing Buffer 36 μL Stop Solution 24 μL MDA primer mix for the gene of interest 180 μL ultrapure water Fill a 1-mL syringe with N1 solution With the valves set to flow out to waste, pump 80 μL of the solution through the DNA channel inlet valve at 80 μL/min to flush out any bubbles Set the valve to flow into the device and then flow 45 μL of solution at 1 μL/min Setup the device on a hotplate set to 3° C.

Setup a humidity chamber around the device to prevent evaporation

Prepare the MDA master mix

75 μL ultrapure water

24 μL MDA primer mix 121.5 μL REPLI-g reaction buffer 4.5 μL DNA polymerase

Fill a 1-mL syringe with MDA reaction mix

With the valves set to flow out to waste, pump the solution through the DNA channel inlet valve at 80 μL/min to flush out any bubbles, and stop flowing once bubbles are flushed out and the fluid stream can be seen in the waste tubing past the valve Set the valve to flow into the device and then flow 50 uL of solution at 0.05 uL/min and collect eluent in an Eppendorf tube

REFERENCES

Citation of a reference herein shall not be construed as an admission that such reference is prior art to the present invention. All references cited herein are hereby incorporated by reference in their entirety. Below is a listing of various references cited herein by Reference (Ref.) number:

1 K. Vermeulen, D. R. Van Bockstaele and Z. N. Berneman, *Cell Proli* 2003, 36, 131-149.

2 B. Vogelstein and K. W. Kinzler, *Nat. Med.,* 2004, 10, 789-799.

3 L. Coin, M. Marshall, T. Down, T. Hubbard, R. Wooster, N. Rahman and M. R. Stratton, *Nat. Rev. Cancer,* 2004, 4, 177-183.

4 P. C. Nowell, *Science,* 1976, 194, 23-28.

5 C. G. Mullighan, S. Goorha, I. Radtke, C. B. Miller, E. Coustan-Smith, J. D. Dalton, K. Girtman, S. Mathew, J. Ma, S. B. Pounds, X. Su, C.-H. Pui, M. V Relling, W. E. Evans, S. A. Shurtleff and J. R. Downing, *Nature,* 2007, 446, 758-64.

6 A. Didelot, D. Le Cone, A. Luscan, A. Cazes, K. Pallier, J. F. Emile, P. Laurent-Puig and H. Blons, *Exp. Mol. Pathol.,* 2012, 92, 275-280.

7 M. N. Nikiforova, A. I. Wald, S. Roy, M. B. Durso and Y. E. Nikiforov, *J. Clin. Endocrinol. Metab.,* 2013, 98, 1852-1860.

8 G. Ellison, G. Zhu, A. Moulis, S. Dearden, G. Speake and R. McCormack, *J. Clin. Pathol.,* 2013, 66, 79-89.

9 P. N. Gray, C. L. M. Dunlop and A. M. Elliott, *Cancers,* 2015, 7, 1313-1332.

10 D. T. Cheng, T. N. Mitchell, A. Zehir, R. H. Shah, R. Benayed, A. Syed, R. Chandramohan, Z. Y. Liu, H. H. Won, S. N. Scott, A. Rose Brannon, C. O'Reilly, J. Sadowska, J. Casanova, A. Yannes, J. F. Hechtman, J. Yao, W. Song, D. S. Ross, A. Oultache, S. Dogan, L. Borsu, M. Hameed, K. Nafa, M. E. Arcila, M. Ladanyi and M. F. Berger, *J. Mol. Diagnostics,* 2015, 17, 251-264.

11 Y. Wan, Y. L. Liu, P. B. Allen, W. Asghar, M. A. I. Mahmood, J. F. Tan, H. Duhon, Y. T. Kim, A. D. Ellington and S. M. Iqbal, *Lab Chip,* 2012, 12, 4693-4701.

12 J. A. Phillips, Y. Xu, Z. Xia, Z. H. Fan and W. Tan, *Anal. Chem.,* 2009, 81, 1033-1039.

13 F. Zheng, Y. Cheng, J. Wang, J. Lu, B. Zhang, Y. Zhao and Z. Gu, *Adv. Mater.,* 2014, 26, 7333-7338.

14 Y. Xu, J. A. Phillips, J. Yan, Q. Li, Z. H. Fan and W. Tan, *Anal. Chem.,* 2009, 81, 7436-7442.

15 W. Sheng, T. Chen, R. Kamath, X. Xiong, W. Tan and Z. H. Fan, *Anal Chem,* 2012, 84, 4199-4206.

16 Q. Shen, L. Xu, L. Zhao, D. Wu, Y. Fan, Y. Zhou, W. H. Ouyang, X. Xu, Z. Zhang, M. Song, T. Lee, M. A. Garcia, B. Xiong, S. Hou, H. R. Tseng and X. Fang, *Adv. Mater.,* 2013, 25, 2368-2373.

17 J. J. Benitez, J. Topolancik, H. C. Tian, C. B. Wallin, D. R. Latulippe, K. Szeto, P. J. Murphy, B. R. Cipriany, S. L. Levy, P. D. Soloway and H. G. Craighead, *Lab Chip,* 2012, 12, 4848.

18 D. Van Simaeys, D. Lopez-Colon, K. Sefah, R. Sutphen, E. Jimenez and W. Tan, *PLoS One,* 2010, 5, e13770.

19 J. P. Gleghorn, E. D. Pratt, D. Denning, H. Liu, N. H. Bander, S. T. Tagawa, D. M. Nanus, P. A. Giannakakou and B. J. Kirby, *Lab Chip,* 2010, 10, 27-29.

20 1 R. Pinard, A. de Winter, G. J. Sarkis, M. B. Gerstein, K. R. Tartaro, R. N. Plant, M. Egholm, J. M. Rothberg and J. H. Leamon, *BMC Genomics,* 2006, 7, 216.

21 C.-Z. Zhang, V. A. Adalsteinsson, J. Francis, H. Cornils, J. Jung, C. Maire, K. L. Ligon, M. Meyerson and J. C. Love, *Nat. Commun.,* 2015, 6, 1-10.

22 J. Sabina and J. H. Leamon, *in Whole Genome Amplification,* ed. T. Kroneis, Springer, New York, 2015, vol. 1347, pp. 15-41.

23 F. B. Dean, S. Hosono, L. Fang, X. Wu, A. F. Faruqi, P. Bray-Ward, Z. Sun, Q. Zong, Y. Du, J. Du, M. Driscoll, W. Song, S. F. Kingsmore, M. Egholm and R. S. Lasken, *Proc. Natl. Acad. Sci. U.S.A.,* 2002, 99, 5261-6.

24 C. Spits, C. Le Caignec, M. De Rycke, L. Van Haute, A. Van Steirteghem, I. Liebaers and K. Sermon, *Nat. Protoc.,* 2006, 1, 1965-1970.

25 J. G. Paez, M. Lin, R. Beroukhim, J. C. Lee, X. Zhao, D. J. Richter, S. Gabriel, P. Herman, H. Sasaki, D. Altshuler, C. Li, M. Meyerson and W. R. Sellers, *Nucleic Acids Res.,* 2004, 32, e71.

26 S. H. L. Mandey, M. S. Schneiders, J. Ã. Koster and H. R. Waterham, *Hum. Mutat.,* 2006, 27, 796-802.

27 M. Hollstein, K. Rice, M. S. Greenblatt, T. Soussi, R. Fuchs, T. Sorlie, E. Hovig, B. Smith-Sorensen, R. Montesano and C. C. Harris, *Nucleic Acids Res.,* 1994, 22, 3551-5.

28 S. J. Foster and B. J. Monahan, *Fungal Genet. Biol.,* 2005, 42, 367-375.

29 O. Alsmadi, F. Alkayal, D. Monies and B. F. Meyer, *BMC Res. Notes,* 2009, 2, 48.

30 R. Kurman and I. Shih, *Int. J. Gynecol. Pathol.,* 2008, 27, 151-160.

Although the present invention has been described for the purpose of illustration, it is understood that such detail is solely for that purpose and variations can be made by those skilled in the art without departing from the spirit and scope of the invention which is defined by the following claims.

What is claimed is:

1. A method of amplifying nucleic acids, the method comprising:

flowing a sample through a cell channel within a microfluidic device to a cell capture array disposed at an intersection of the cell channel and a nucleic acid channel within the microfluidic device to immobilize a cell from the sample on a plurality of structures of the cell capture array while flowing a remainder of the sample downstream of the cell capture array in the cell channel;

lysing the cell to release nucleic acids from the cell and flow the nucleic acids from the cell capture array to an entanglement array within the nucleic acid channel to capture the nucleic acids within the microfluidic device on the entanglement array, wherein the entanglement array comprises a plurality of nucleic acid entanglement micropillars configured and arranged in a manner effective to physically entangle and maintain thereon genomic DNA isolated from the cell;

flowing amplification reagents into the nucleic acid channel; and copying the captured nucleic acids within the microfluidic device while the nucleic acids are captured and maintained on the plurality of nucleic acid entanglement micropillars under flow at the entanglement array using the amplification reagents.

2. The method of claim 1, wherein the nucleic acids include genomic DNA (gDNA), the method further comprising eluting the gDNA from the nucleic acid channel.

3. The method of claim 1, wherein the cell is a target cell, and the remainder of the sample includes a mixture of non-target cells.

4. The method of claim 3, further comprising immobilizing the target cell with a capture ligand specific to a cell type of the target cell.

5. The method of claim 1, wherein the amplification reagents comprise one or more primers and a polymerase.

6. The method of claim 1, further comprising extracting amplification products from an outlet of the nucleic acid channel.

7. The device of claim 1, wherein the plurality of structures are functionalized with antibodies or aptamers.

8. The method of claim 5, wherein copying the nucleic acids at the entanglement array comprises a multiple displacement amplification (MDA) process.

9. The method of claim 8, wherein the polymerase is φ29 and the one or more primers are selected from one or more of SEQ ID NOS: 4-123.

10. The method of claim 1, wherein the cell capture array and the entanglement array are separated, and flowing the nucleic acids from the cell capture array to the entanglement array comprises moving the nucleic acids from the cell capture array to the entanglement array.

11. The method of claim 1, wherein the cell capture array has attached thereto cell-capture ligands that bind to cells of a specific cell type.

12. The method of claim 11, wherein the cells of the specific cell type are cancer cells.

13. The method of claim 12, wherein the cell-capture ligands comprise aptamers.

14. The method of claim 13, wherein the nucleic acids include genomic DNA (gDNA), the method further comprising collecting amplification products from an outlet of the nucleic acid channel.

15. The method of claim 14, wherein the gDNA remains entangled at the entanglement array during flow of the amplification reagents through the nucleic acid channel.

16. The method of claim 11, wherein the copying step includes amplifying one or more individual genes of interest while the gDNA is maintained under flow conditions.

17. The method of claim 16, further comprising amplifying the individual genes of interest consecutively.

18. The method of claim 17, further comprising collecting amplification products separately.

* * * * *